US008653950B2

(12) United States Patent
Harris et al.

(10) Patent No.: US 8,653,950 B2
(45) Date of Patent: Feb. 18, 2014

(54) STATE-BASED REMOTE CONTROL SYSTEM

(75) Inventors: Glen McLean Harris, Ontario (CA);
Justin M. Henry, Ontario (CA)

(73) Assignee: Logitech Europe S.A., Lausanne (CH)

( * ) Notice: Subject to any disclaimer, the term of this patent is extended or adjusted under 35 U.S.C. 154(b) by 130 days.

(21) Appl. No.: 13/027,153

(22) Filed: Feb. 14, 2011

(65) Prior Publication Data

US 2011/0133976 A1    Jun. 9, 2011

Related U.S. Application Data

(63) Continuation of application No. 11/841,753, filed on Aug. 20, 2007, now abandoned, which is a continuation of application No. 11/411,398, filed on Apr. 25, 2006, now Pat. No. 8,531,276, which is a continuation of application No. 10/870,339, filed on Jun. 16, 2004, now Pat. No. 8,026,789, which is a continuation of application No. 09/804,718, filed on Mar. 12, 2001, now Pat. No. 6,784,805.

(60) Provisional application No. 60/253,727, filed on Nov. 29, 2000, provisional application No. 60/189,487, filed on Mar. 15, 2000.

(51) Int. Cl.
*G05B 19/05* (2006.01)

(52) U.S. Cl.
USPC ............... 340/12.22; 340/12.28; 341/176

(58) Field of Classification Search
USPC ......... 340/4.3, 4.31, 4.32, 4.42, 12.22, 12.23, 340/12.24, 12.25, 12.28, 13.21, 13.24; 341/176; 348/734; 398/106, 111, 112
See application file for complete search history.

(56) References Cited

U.S. PATENT DOCUMENTS

| 3,597,531 A | 8/1971 | De Marinis et al. |
| 3,990,012 A | 11/1976 | Karnes |
| 4,174,517 A | 11/1979 | Mandel |

(Continued)

FOREIGN PATENT DOCUMENTS

| AU | 66267/90 | 4/1992 |
| AU | 200169851 A1 | 1/2002 |

(Continued)

OTHER PUBLICATIONS

Ciarcia, S., "Build a Trainable Infrared Master Controller," *Byte*, 12(3): 113-123 (1987).

(Continued)

*Primary Examiner* — Edwin Holloway, III
(74) *Attorney, Agent, or Firm* — Kilpatrick Townsend & Stockton LLP

(57) ABSTRACT

A remote control system includes a remote control device configured to control a plurality of consumer electronic devices. The remote control system further includes a programming system configured to: i) receive identifying information, which identifies each of the consumer electronic devices, ii) generate at least one macro, which is configured for collectively controlling the consumer electronic devices to perform a media function; and iii) issue a query to a user to determine whether the macro is to be used by the remote control device. If a positive response is received by the programming system in response to the query, then configuring the remote control device for using the macro. If a negative response is received by the programming system in response to the query, then not configuring the remote control device for using the macro.

25 Claims, 14 Drawing Sheets

(56) References Cited

U.S. PATENT DOCUMENTS

| | | |
|---|---|---|
| 4,231,031 A | 10/1980 | Crowther et al. |
| 4,287,676 A | 9/1981 | Weinhaus |
| 4,377,870 A | 3/1983 | Anderson et al. |
| 4,392,022 A | 7/1983 | Carlson |
| 4,394,691 A | 7/1983 | Amano et al. |
| 4,475,123 A | 10/1984 | Dumbauld et al. |
| 4,488,179 A | 12/1984 | Kruger et al. |
| 4,566,034 A | 1/1986 | Harger et al. |
| 4,567,512 A | 1/1986 | Abraham |
| 4,592,546 A | 6/1986 | Fascenda et al. |
| 4,623,887 A | 11/1986 | Welles, II |
| 4,626,848 A | 12/1986 | Ehlers |
| 4,703,359 A | 10/1987 | Rumbolt et al. |
| 4,706,121 A | 11/1987 | Young |
| 4,712,105 A | 12/1987 | Kohler |
| 4,728,949 A | 3/1988 | Platte et al. |
| 4,746,919 A | 5/1988 | Reitmeier |
| 4,774,511 A | 9/1988 | Rumbolt et al. |
| 4,792,972 A | 12/1988 | Cook, Jr. |
| 4,799,141 A | 1/1989 | Drusinsky et al. |
| 4,807,031 A | 2/1989 | Broughton et al. |
| 4,825,200 A | 4/1989 | Evans et al. |
| 4,825,209 A | 4/1989 | Sasaki et al. |
| 4,837,627 A | 6/1989 | Mengel |
| 4,845,491 A | 7/1989 | Fascenda et al. |
| 4,857,898 A | 8/1989 | Smith |
| 4,866,434 A | 9/1989 | Keenan |
| 4,876,592 A | 10/1989 | Von Kohorn |
| 4,888,709 A | 12/1989 | Revesz et al. |
| 4,899,370 A | 2/1990 | Kameo et al. |
| 4,918,439 A | 4/1990 | Wozniak et al. |
| 4,941,090 A | 7/1990 | McCarthy |
| 4,959,719 A | 9/1990 | Strubbe et al. |
| 4,959,810 A | 9/1990 | Darbee et al. |
| RE33,369 E | 10/1990 | Hashimoto |
| 4,962,466 A | 10/1990 | Revesz et al. |
| 4,989,081 A | 1/1991 | Miyagawa et al. |
| 4,999,622 A | 3/1991 | Amano et al. |
| 5,001,554 A | 3/1991 | Johnson et al. |
| 5,016,272 A | 5/1991 | Stubbs et al. |
| 5,033,079 A | 7/1991 | Catron et al. |
| 5,038,401 A | 8/1991 | Inotsume |
| 5,046,093 A | 9/1991 | Wachob |
| 5,065,235 A | 11/1991 | Iijima |
| 5,065,251 A | 11/1991 | Shuhart, Jr. et al. |
| 5,089,885 A | 2/1992 | Clark |
| 5,097,249 A | 3/1992 | Yamamoto |
| 5,109,222 A | 4/1992 | Welty |
| 5,115,236 A | 5/1992 | Kohler |
| 5,117,355 A | 5/1992 | McCarthy |
| 5,128,752 A | 7/1992 | Von Kohorn |
| 5,132,679 A | 7/1992 | Kubo et al. |
| 5,140,326 A | 8/1992 | Bacrania et al. |
| 5,151,789 A | 9/1992 | Young |
| 5,161,023 A | 11/1992 | Keenan |
| 5,177,461 A | 1/1993 | Budzyna |
| 5,202,826 A | 4/1993 | McCarthy |
| 5,204,768 A | 4/1993 | Tsakiris et al. |
| 5,206,722 A | 4/1993 | Kwan |
| 5,220,420 A | 6/1993 | Hoarty et al. |
| 5,228,077 A | 7/1993 | Darbee |
| 5,237,327 A | 8/1993 | Saitoh et al. |
| 5,249,044 A | 9/1993 | Von Kohorn |
| 5,251,048 A | 10/1993 | Doane et al. |
| 5,255,313 A | 10/1993 | Darbee |
| 5,272,418 A | 12/1993 | Howe et al. |
| 5,282,028 A | 1/1994 | Johnson et al. |
| 5,285,278 A | 2/1994 | Holman |
| 5,287,181 A | 2/1994 | Holman |
| 5,287,268 A | 2/1994 | McCarthy |
| 5,297,204 A | 3/1994 | Levine |
| 5,341,166 A | 8/1994 | Garr et al. |
| 5,353,121 A | 10/1994 | Young et al. |
| 5,355,480 A | 10/1994 | Smith et al. |
| 5,367,316 A | 11/1994 | Ikezaki |
| 5,374,999 A | 12/1994 | Chuang et al. |
| 5,381,991 A | 1/1995 | Stocker |
| 5,382,947 A | 1/1995 | Thaler et al. |
| 5,384,067 A | 1/1995 | Doane et al. |
| 5,404,393 A | 4/1995 | Remillard |
| 5,406,558 A | 4/1995 | Rovira et al. |
| 5,410,326 A | 4/1995 | Goldstein |
| 5,410,367 A | 4/1995 | Zahavi |
| 5,410,543 A | 4/1995 | Seitz et al. |
| 5,414,426 A * | 5/1995 | O'Donnell et al. ........... 341/176 |
| 5,414,761 A | 5/1995 | Darbee |
| 5,416,535 A | 5/1995 | Sato et al. |
| 5,418,424 A | 5/1995 | Aprile et al. |
| 5,422,783 A | 6/1995 | Darbee et al. |
| 5,446,551 A | 8/1995 | Kawaguchi et al. |
| 5,450,079 A | 9/1995 | Dunaway |
| 5,455,570 A | 10/1995 | Cook et al. |
| 5,461,667 A | 10/1995 | Remillard |
| 5,479,266 A | 12/1995 | Young et al. |
| 5,479,268 A | 12/1995 | Young et al. |
| 5,481,251 A | 1/1996 | Buys et al. |
| 5,481,256 A | 1/1996 | Darbee et al. |
| 5,483,276 A | 1/1996 | Brooks et al. |
| 5,497,185 A | 3/1996 | Dufresne et al. |
| 5,500,681 A | 3/1996 | Jones |
| 5,500,794 A | 3/1996 | Fujita et al. |
| 5,502,504 A | 3/1996 | Marshall et al. |
| 5,504,475 A | 4/1996 | Houdou et al. |
| 5,510,828 A | 4/1996 | Lutterbach et al. |
| 5,515,052 A | 5/1996 | Darbee |
| 5,515,106 A | 5/1996 | Chaney et al. |
| 5,515,270 A | 5/1996 | Weinblatt |
| 5,517,254 A | 5/1996 | Monta et al. |
| 5,523,794 A | 6/1996 | Mankovitz et al. |
| 5,523,796 A | 6/1996 | Marshall et al. |
| 5,524,141 A | 6/1996 | Braun et al. |
| 5,524,195 A | 6/1996 | Clanton, III et al. |
| 5,528,304 A | 6/1996 | Cherrick et al. |
| 5,532,689 A | 7/1996 | Bueno |
| 5,532,732 A | 7/1996 | Yuen et al. |
| 5,532,754 A | 7/1996 | Young et al. |
| 5,537,106 A | 7/1996 | Mitsuhashi |
| 5,537,107 A | 7/1996 | Funado |
| 5,537,463 A | 7/1996 | Escobosa et al. |
| 5,539,393 A | 7/1996 | Barfod |
| 5,550,576 A | 8/1996 | Klosterman |
| 5,552,837 A | 9/1996 | Mankovitz |
| 5,552,917 A | 9/1996 | Darbee et al. |
| 5,557,338 A | 9/1996 | Maze et al. |
| 5,557,721 A | 9/1996 | Fite et al. |
| 5,559,548 A | 9/1996 | Davis et al. |
| 5,566,353 A | 10/1996 | Cho et al. |
| 5,568,367 A | 10/1996 | Park |
| 5,576,755 A | 11/1996 | Davis et al. |
| 5,576,768 A | 11/1996 | Gomikawa |
| 5,579,055 A | 11/1996 | Hamilton et al. |
| 5,579,221 A | 11/1996 | Mun |
| 5,583,491 A | 12/1996 | Kim |
| 5,585,838 A | 12/1996 | Lawler et al. |
| 5,585,866 A | 12/1996 | Miller et al. |
| 5,589,892 A | 12/1996 | Knee et al. |
| 5,592,551 A | 1/1997 | Lett et al. |
| 5,596,373 A | 1/1997 | White et al. |
| 5,600,573 A | 2/1997 | Hendricks et al. |
| 5,603,078 A | 2/1997 | Henderson et al. |
| 5,604,616 A | 2/1997 | Dunn et al. |
| 5,604,923 A | 2/1997 | Wilkus |
| 5,608,446 A | 3/1997 | Carr et al. |
| 5,614,906 A | 3/1997 | Hayes et al. |
| 5,619,196 A | 4/1997 | Escobosa |
| 5,619,251 A | 4/1997 | Kuroiwa et al. |
| 5,625,608 A | 4/1997 | Grewe et al. |
| 5,627,567 A | 5/1997 | Davidson |
| 5,629,733 A | 5/1997 | Youman et al. |
| 5,629,868 A | 5/1997 | Tessier et al. |
| 5,631,652 A | 5/1997 | Lee |
| 5,638,050 A | 6/1997 | Sacca et al. |
| 5,638,113 A | 6/1997 | Lappington et al. |
| 5,646,608 A | 7/1997 | Shintani |

(56) References Cited

U.S. PATENT DOCUMENTS

| | | |
|---|---|---|
| 5,650,831 A | 7/1997 | Farwell |
| 5,663,757 A | 9/1997 | Morales |
| 5,671,267 A | 9/1997 | August et al. |
| 5,677,711 A | 10/1997 | Kuo |
| 5,684,526 A | 11/1997 | Yoshinobu |
| 5,686,891 A | 11/1997 | Sacca et al. |
| 5,689,353 A | 11/1997 | Darbee et al. |
| 5,691,795 A | 11/1997 | Doane et al. |
| 5,695,400 A | 12/1997 | Fennell, Jr. et al. |
| 5,710,601 A | 1/1998 | Marshall et al. |
| 5,710,605 A | 1/1998 | Nelson |
| 5,721,597 A | 2/1998 | Kakinurna et al. |
| 5,734,838 A | 3/1998 | Robinson et al. |
| 5,761,601 A | 6/1998 | Nemirofsky et al. |
| 5,768,680 A | 6/1998 | Thomas |
| 5,774,172 A | 6/1998 | Kapell et al. |
| 5,778,256 A | 7/1998 | Darbee |
| 5,781,894 A | 7/1998 | Petrecca et al. |
| 5,786,814 A | 7/1998 | Moran et al. |
| 5,794,210 A | 8/1998 | Goldhaber et al. |
| 5,796,832 A | 8/1998 | Kawan |
| 5,800,268 A | 9/1998 | Molnick |
| 5,806,065 A | 9/1998 | Lomet |
| 5,815,086 A | 9/1998 | Ivie et al. |
| 5,819,034 A | 10/1998 | Joseph et al. |
| 5,819,294 A | 10/1998 | Chambers et al. |
| 5,822,123 A | 10/1998 | Davis et al. |
| 5,828,318 A | 10/1998 | Cesar et al. |
| 5,828,945 A | 10/1998 | Klosterman |
| 5,832,296 A | 11/1998 | Wang et al. |
| 5,847,798 A | 12/1998 | Yang et al. |
| 5,850,249 A | 12/1998 | Massetti et al. |
| 5,855,008 A | 12/1998 | Goldhaber et al. |
| 5,870,030 A | 2/1999 | Deluca et al. |
| 5,870,683 A | 2/1999 | Wells |
| RE36,119 E | 3/1999 | Kunishima |
| 5,883,680 A | 3/1999 | Nykerk |
| 5,886,691 A | 3/1999 | Furuya et al. |
| 5,907,322 A | 5/1999 | Kelly et al. |
| 5,909,183 A | 6/1999 | Borgstahl et al. |
| 5,923,016 A | 7/1999 | Fredregill et al. |
| 5,940,073 A | 8/1999 | Klosterman et al. |
| 5,943,228 A | 8/1999 | Kim |
| 5,946,646 A | 8/1999 | Schena et al. |
| 5,949,351 A * | 9/1999 | Hahm ........................ 340/4.42 |
| 5,953,144 A | 9/1999 | Darbee et al. |
| 5,959,751 A | 9/1999 | Darbee et al. |
| 5,963,145 A | 10/1999 | Escobosa |
| 5,999,207 A | 12/1999 | Rodriguez et al. |
| 6,002,443 A | 12/1999 | Iggulden |
| 6,002,450 A | 12/1999 | Darbee et al. |
| 6,008,802 A | 12/1999 | Iki et al. |
| 6,009,410 A | 12/1999 | LeMole et al. |
| 6,012,088 A | 1/2000 | Li et al. |
| 6,014,092 A | 1/2000 | Darbee et al. |
| 6,040,829 A | 3/2000 | Croy et al. |
| 6,057,872 A | 5/2000 | Candelore |
| 6,097,309 A | 8/2000 | Hayes et al. |
| 6,097,441 A | 8/2000 | Allport |
| 6,097,520 A | 8/2000 | Kadnier |
| 6,104,334 A * | 8/2000 | Allport ........................ 341/175 |
| 6,127,941 A | 10/2000 | Van Ryzin et al. |
| 6,130,625 A | 10/2000 | Harvey |
| 6,130,726 A | 10/2000 | Darbee et al. |
| 6,133,847 A | 10/2000 | Yang |
| 6,134,512 A | 10/2000 | Barrett |
| 6,144,315 A | 11/2000 | Flick |
| 6,144,375 A | 11/2000 | Jain et al. |
| 6,147,677 A | 11/2000 | Escobosa et al. |
| 6,148,241 A | 11/2000 | Ludtke et al. |
| 6,154,204 A | 11/2000 | Thompson et al. |
| 6,154,209 A | 11/2000 | Naughton et al. |
| 6,157,319 A | 12/2000 | Johns et al. |
| 6,169,451 B1 | 1/2001 | Kim |
| 6,173,330 B1 | 1/2001 | Guo et al. |
| 6,177,931 B1 | 1/2001 | Alexander et al. |
| 6,195,033 B1 | 2/2001 | Darbee et al. |
| 6,198,479 B1 | 3/2001 | Humpleman et al. |
| 6,198,481 B1 | 3/2001 | Urano et al. |
| 6,208,341 B1 | 3/2001 | van Ee et al. |
| 6,211,870 B1 | 4/2001 | Foster |
| 6,223,348 B1 | 4/2001 | Hayes et al. |
| 6,225,938 B1 | 5/2001 | Hayes et al. |
| 6,243,035 B1 | 6/2001 | Walter et al. |
| 6,255,961 B1 | 7/2001 | Van Ryzin et al. |
| 6,263,346 B1 | 7/2001 | Rodriquez |
| 6,271,831 B1 | 8/2001 | Escobosa et al. |
| 6,275,268 B1 | 8/2001 | Ellis et al. |
| 6,278,499 B1 | 8/2001 | Darbee |
| 6,288,799 B1 | 9/2001 | Sekiguchi |
| 6,326,947 B1 | 12/2001 | Capps et al. |
| 6,330,091 B1 | 12/2001 | Escobosa et al. |
| 6,369,803 B2 | 4/2002 | Brisebois et al. |
| 6,374,404 B1 | 4/2002 | Brotz et al. |
| 6,397,187 B1 | 5/2002 | Vriens et al. |
| 6,407,779 B1 | 6/2002 | Herz |
| 6,408,435 B1 * | 6/2002 | Sato ........................ 725/58 |
| 6,445,306 B1 | 9/2002 | Trovato et al. |
| 6,469,633 B1 | 10/2002 | Wachter |
| 6,483,548 B1 | 11/2002 | Allport |
| 6,483,906 B1 | 11/2002 | Iggulden et al. |
| 6,496,135 B1 | 12/2002 | Darbee |
| 6,496,927 B1 | 12/2002 | McGrane et al. |
| 6,504,580 B1 | 1/2003 | Thompson |
| 6,522,262 B1 | 2/2003 | Hayes et al. |
| 6,532,592 B1 | 3/2003 | Shintani et al. |
| 6,538,556 B1 | 3/2003 | Kawajiri |
| 6,563,430 B1 | 5/2003 | Kemink et al. |
| 6,567,011 B1 | 5/2003 | Young et al. |
| 6,567,984 B1 | 5/2003 | Allport |
| 6,587,067 B2 | 7/2003 | Darbee et al. |
| 6,597,374 B1 | 7/2003 | Baker et al. |
| 6,628,340 B1 | 9/2003 | Graczyk et al. |
| 6,629,077 B1 | 9/2003 | Arling et al. |
| 6,637,028 B1 | 10/2003 | Voyticky et al. |
| 6,640,144 B1 * | 10/2003 | Huang et al. ........................ 700/65 |
| 6,642,852 B2 | 11/2003 | Dresti et al. |
| 6,650,247 B1 | 11/2003 | Hayes |
| 6,657,679 B2 | 12/2003 | Hayes et al. |
| 6,690,290 B2 | 2/2004 | Young et al. |
| 6,690,392 B1 * | 2/2004 | Wugoski ........................ 715/744 |
| 6,701,091 B2 | 3/2004 | Escobosa et al. |
| 6,720,904 B1 | 4/2004 | Darbee |
| 6,722,984 B1 | 4/2004 | Sweeney, Jr. et al. |
| 6,724,339 B2 | 4/2004 | Conway et al. |
| 6,747,591 B1 | 6/2004 | Lilleness et al. |
| 6,748,248 B1 | 6/2004 | Pan et al. |
| 6,748,462 B2 | 6/2004 | Dubil et al. |
| 6,759,967 B1 * | 7/2004 | Staller ........................ 340/12.28 |
| 6,781,518 B1 | 8/2004 | Hayes et al. |
| 6,781,638 B1 | 8/2004 | Hayes |
| 6,784,804 B1 | 8/2004 | Hayes et al. |
| 6,784,805 B2 | 8/2004 | Harris et al. |
| 6,785,579 B2 | 8/2004 | Huang et al. |
| 6,788,241 B2 | 9/2004 | Arling et al. |
| 6,813,619 B2 | 11/2004 | Devara |
| 6,826,370 B2 | 11/2004 | Escobosa et al. |
| 6,828,992 B1 | 12/2004 | Freeman et al. |
| 6,829,512 B2 | 12/2004 | Huang et al. |
| 6,829,992 B2 | 12/2004 | Kobayashi et al. |
| 6,842,653 B2 | 1/2005 | Weishut et al. |
| 6,847,101 B2 | 1/2005 | Fjelstad et al. |
| 6,859,197 B2 | 2/2005 | Klein et al. |
| 6,862,741 B1 | 3/2005 | Grooters |
| 6,870,463 B2 | 3/2005 | Dresti et al. |
| 6,874,037 B1 | 3/2005 | Abram |
| 6,882,299 B1 | 4/2005 | Allport |
| 6,882,729 B2 | 4/2005 | Arling et al. |
| 6,885,952 B1 | 4/2005 | Hayes et al. |
| 6,917,302 B2 | 7/2005 | Lilleness et al. |
| 6,933,833 B1 | 8/2005 | Darbee |
| 6,938,101 B2 | 8/2005 | Hayes et al. |
| 6,946,988 B2 | 9/2005 | Edwards et al. |
| 6,947,101 B2 | 9/2005 | Arling |

(56) References Cited

U.S. PATENT DOCUMENTS

| | | |
|---|---|---|
| 6,968,570 B2 | 11/2005 | Hayes et al. |
| 6,980,150 B2 | 12/2005 | Conway et al. |
| 7,005,979 B2 | 2/2006 | Haughawout et al. |
| 7,009,528 B2 | 3/2006 | Griep |
| 7,010,805 B2 | 3/2006 | Hayes et al. |
| 7,013,434 B2 | 3/2006 | Masters et al. |
| RE39,059 E | 4/2006 | Foster |
| 7,046,161 B2 | 5/2006 | Hayes |
| 7,079,113 B1 | 7/2006 | Hayes et al. |
| 7,091,898 B2 | 8/2006 | Arling et al. |
| 7,093,003 B2 | 8/2006 | Yuh et al. |
| 7,102,688 B2 | 9/2006 | Hayes et al. |
| 7,119,710 B2 | 10/2006 | Hayes et al. |
| 7,126,468 B2 | 10/2006 | Arling et al. |
| 7,129,995 B2 | 10/2006 | Arling |
| 7,135,985 B2 | 11/2006 | Woolgar et al. |
| 7,136,709 B2 | 11/2006 | Arling et al. |
| 7,142,127 B2 | 11/2006 | Hayes et al. |
| 7,142,934 B2 | 11/2006 | Janik |
| 7,142,935 B2 | 11/2006 | Janik |
| 7,143,214 B2 | 11/2006 | Hayes et al. |
| 7,151,528 B2 | 12/2006 | Taylor et al. |
| 7,154,428 B2 | 12/2006 | de Clercq et al. |
| 7,154,483 B2 | 12/2006 | Kobayashi |
| 7,155,305 B2 | 12/2006 | Hayes et al. |
| 7,161,524 B2 | 1/2007 | Nguyen |
| 7,167,765 B2 | 1/2007 | Janik |
| 7,167,913 B2 | 1/2007 | Chambers |
| 7,193,661 B2 | 3/2007 | Dresti et al. |
| 7,200,357 B2 | 4/2007 | Janik et al. |
| 7,209,116 B2 | 4/2007 | Gates et al. |
| 7,218,243 B2 | 5/2007 | Hayes et al. |
| 7,221,306 B2 | 5/2007 | Young |
| 7,224,903 B2 | 5/2007 | Colmenarez et al. |
| RE39,716 E | 7/2007 | Huang et al. |
| 7,253,765 B2 | 8/2007 | Edwards et al. |
| 7,254,777 B2 | 8/2007 | Hayes et al. |
| 7,266,701 B2 | 9/2007 | Hayes et al. |
| 7,266,777 B2 | 9/2007 | Scott et al. |
| 7,268,694 B2 | 9/2007 | Hayes et al. |
| 7,274,303 B2 | 9/2007 | Dresti et al. |
| 7,281,262 B2 | 10/2007 | Hayes et al. |
| 7,283,059 B2 | 10/2007 | Harris et al. |
| 7,319,409 B2 | 1/2008 | Hayes et al. |
| 7,319,426 B2 | 1/2008 | Garfio |
| 7,436,319 B1 | 10/2008 | Harris et al. |
| 7,562,128 B1 | 7/2009 | Caris et al. |
| 7,574,693 B1 | 8/2009 | Kemink |
| 7,612,685 B2 | 11/2009 | Harris et al. |
| 7,746,244 B2 | 6/2010 | Wouters |
| 7,889,095 B1 | 2/2011 | Harris et al. |
| 7,944,370 B1 | 5/2011 | Harris et al. |
| 8,026,789 B2 | 9/2011 | Harris et al. |
| 8,098,140 B1 | 1/2012 | Escobosa et al. |
| 2001/0033243 A1 | 10/2001 | Harris et al. |
| 2002/0008789 A1 | 1/2002 | Harris et al. |
| 2002/0046083 A1 | 4/2002 | Ondeck |
| 2002/0056084 A1 | 5/2002 | Harris et al. |
| 2002/0130834 A1 | 9/2002 | Madarasz et al. |
| 2002/0151327 A1 | 10/2002 | Levitt |
| 2002/0170073 A1 | 11/2002 | Miller et al. |
| 2002/0184626 A1 | 12/2002 | Darbee et al. |
| 2002/0190956 A1 | 12/2002 | Klein et al. |
| 2002/0194410 A1 | 12/2002 | Hayes et al. |
| 2003/0046579 A1 | 3/2003 | Hayes et al. |
| 2003/0048295 A1 | 3/2003 | Lilleness et al. |
| 2003/0095156 A1 | 5/2003 | Klein et al. |
| 2003/0103088 A1 | 6/2003 | Dresti et al. |
| 2003/0117427 A1 | 6/2003 | Haughawout et al. |
| 2003/0151538 A1 | 8/2003 | Escobosa et al. |
| 2003/0164773 A1 | 9/2003 | Young et al. |
| 2003/0164787 A1 | 9/2003 | Dresti et al. |
| 2003/0189509 A1 | 10/2003 | Hayes et al. |
| 2003/0191650 A1 | 10/2003 | Turner et al. |
| 2003/0193519 A1 | 10/2003 | Hayes et al. |
| 2003/0233664 A1 | 12/2003 | Huang et al. |
| 2004/0046677 A1 | 3/2004 | Dresti et al. |
| 2004/0056789 A1 | 3/2004 | Arling et al. |
| 2004/0056984 A1 | 3/2004 | Hayes et al. |
| 2004/0070491 A1 | 4/2004 | Huang et al. |
| 2004/0093096 A1 | 5/2004 | Huang et al. |
| 2004/0117632 A1 | 6/2004 | Arling et al. |
| 2004/0136726 A1 | 7/2004 | Escobosa et al. |
| 2004/0169590 A1 | 9/2004 | Haughawout et al. |
| 2004/0169598 A1 | 9/2004 | Arling et al. |
| 2004/0189508 A1 | 9/2004 | Nguyen |
| 2004/0189509 A1 | 9/2004 | Lilleness et al. |
| 2004/0210933 A1 | 10/2004 | Dresti et al. |
| 2004/0246165 A1 | 12/2004 | Conway, Jr. et al. |
| 2004/0261134 A1 | 12/2004 | Perlman |
| 2004/0263349 A1 | 12/2004 | Haughawout et al. |
| 2004/0266419 A1 | 12/2004 | Arling et al. |
| 2004/0268391 A1 | 12/2004 | de Clercq et al. |
| 2005/0024226 A1 | 2/2005 | Hayes et al. |
| 2005/0030196 A1 | 2/2005 | Harris et al. |
| 2005/0052423 A1 | 3/2005 | Harris et al. |
| 2005/0055716 A1 | 3/2005 | Louie et al. |
| 2005/0062614 A1 | 3/2005 | Young |
| 2005/0062636 A1 | 3/2005 | Conway et al. |
| 2005/0066370 A1 | 3/2005 | Alvarado et al. |
| 2005/0078087 A1 | 4/2005 | Gates et al. |
| 2005/0080496 A1 | 4/2005 | Hayes et al. |
| 2005/0088315 A1 | 4/2005 | Klein et al. |
| 2005/0094610 A1 | 5/2005 | de Clerq et al. |
| 2005/0096753 A1 | 5/2005 | Arling et al. |
| 2005/0097594 A1 | 5/2005 | O'Donnell et al. |
| 2005/0097618 A1 | 5/2005 | Arling et al. |
| 2005/0107966 A1 | 5/2005 | Hayes |
| 2005/0116930 A1 | 6/2005 | Gates |
| 2005/0134578 A1 | 6/2005 | Chambers et al. |
| 2005/0159823 A1 | 7/2005 | Hayes et al. |
| 2005/0162282 A1 | 7/2005 | Dresti et al. |
| 2005/0179559 A1 | 8/2005 | Edwards et al. |
| 2005/0183104 A1 | 8/2005 | Edwards et al. |
| 2005/0195979 A1 | 9/2005 | Arling et al. |
| 2005/0200598 A1 | 9/2005 | Hayes et al. |
| 2005/0210101 A1 | 9/2005 | Janik |
| 2005/0216606 A1 | 9/2005 | Hayes et al. |
| 2005/0216843 A1 | 9/2005 | Masters et al. |
| 2005/0231649 A1 | 10/2005 | Arling |
| 2005/0258806 A1 | 11/2005 | Janik et al. |
| 2005/0280743 A1 | 12/2005 | Dresti et al. |
| 2005/0283814 A1 | 12/2005 | Scott et al. |
| 2005/0285750 A1 | 12/2005 | Hayes et al. |
| 2006/0007306 A1 | 1/2006 | Masters et al. |
| 2006/0012488 A1 | 1/2006 | Hilbrink et al. |
| 2006/0031400 A1 | 2/2006 | Yuh et al. |
| 2006/0031437 A1 | 2/2006 | Chambers |
| 2006/0031549 A1 | 2/2006 | Janik et al. |
| 2006/0031550 A1 | 2/2006 | Janik et al. |
| 2006/0050142 A1 | 3/2006 | Scott et al. |
| 2006/0055554 A1 | 3/2006 | Hayes et al. |
| 2006/0101498 A1 | 5/2006 | Arling et al. |
| 2006/0125800 A1 | 6/2006 | Janik |
| 2006/0132458 A1 | 6/2006 | Garfio et al. |
| 2006/0143572 A1 | 6/2006 | Scott et al. |
| 2006/0150120 A1 | 7/2006 | Dresti et al. |
| 2006/0161865 A1 | 7/2006 | Scott et al. |
| 2006/0192855 A1 | 8/2006 | Harris et al. |
| 2006/0194549 A1 | 8/2006 | Janik et al. |
| 2006/0200538 A1 | 9/2006 | Yuh et al. |
| 2006/0259183 A1 | 11/2006 | Hayes et al. |
| 2006/0259184 A1 | 11/2006 | Hayes et al. |
| 2006/0259864 A1 | 11/2006 | Klein et al. |
| 2006/0262002 A1 | 11/2006 | Nguyen |
| 2006/0283697 A1 | 12/2006 | Garfio |
| 2006/0288300 A1 | 12/2006 | Chambers et al. |
| 2006/0294217 A1 | 12/2006 | Chambers |
| 2007/0037522 A1 | 2/2007 | Liu et al. |
| 2007/0052547 A1 | 3/2007 | Haughawout et al. |
| 2007/0061027 A1 | 3/2007 | Janik |
| 2007/0061028 A1 | 3/2007 | Janik |
| 2007/0061029 A1 | 3/2007 | Janik |
| 2007/0063860 A1 | 3/2007 | Escobosa et al. |

(56) References Cited

U.S. PATENT DOCUMENTS

| | | |
|---|---|---|
| 2007/0073958 A1 | 3/2007 | Kalayjian |
| 2007/0077784 A1 | 4/2007 | Kalayjian et al. |
| 2007/0097275 A1 | 5/2007 | Dresti et al. |
| 2007/0136693 A1 | 6/2007 | Lilleness et al. |
| 2007/0156739 A1 | 7/2007 | Black et al. |
| 2007/0178830 A1 | 8/2007 | Janik et al. |
| 2007/0206949 A1 | 9/2007 | Mortensen |
| 2007/0225828 A1 | 9/2007 | Huang et al. |
| 2007/0233740 A1 | 10/2007 | Nichols et al. |
| 2007/0258595 A1 | 11/2007 | Choy |
| 2007/0271267 A1 | 11/2007 | Lim et al. |
| 2007/0279244 A1 | 12/2007 | Haughawout et al. |
| 2007/0296552 A1 | 12/2007 | Huang et al. |
| 2008/0005764 A1 | 1/2008 | Arling et al. |
| 2008/0016467 A1 | 1/2008 | Chambers et al. |
| 2008/0016468 A1 | 1/2008 | Chambers et al. |
| 2008/0036642 A1 | 2/2008 | Harris et al. |
| 2008/0042982 A1 | 2/2008 | Gates et al. |
| 2008/0062033 A1 | 3/2008 | Harris et al. |
| 2008/0062034 A1 | 3/2008 | Harris et al. |
| 2008/0068247 A1 | 3/2008 | Harris et al. |
| 2008/0198059 A1 | 8/2008 | Harris et al. |
| 2008/0302582 A1 | 12/2008 | Sekhri et al. |
| 2009/0224955 A1 | 9/2009 | Bates et al. |
| 2010/0033638 A1 | 2/2010 | O'Donnell et al. |
| 2012/0326852 A1 | 12/2012 | Harris et al. |

FOREIGN PATENT DOCUMENTS

| | | |
|---|---|---|
| CA | 2092003 A1 | 11/2008 |
| CN | 1399444 A | 2/2003 |
| CN | 1434422 A | 8/2003 |
| DE | 19520754 A1 | 12/1996 |
| EP | 103 438 A1 | 3/1984 |
| EP | 0103438 A1 | 3/1984 |
| EP | 0398 550 | 11/1990 |
| EP | 0626635 | 11/1994 |
| EP | 0972280 A1 | 1/2000 |
| EP | 1014577 A1 | 6/2000 |
| EP | 1198069 B1 | 4/2002 |
| EP | 1777830 A1 | 4/2007 |
| FR | 2738931 A1 | 3/1997 |
| GB | 2081948 A | 2/1982 |
| GB | 2175724 A | 12/1986 |
| GB | 2304217 A | 3/1997 |
| JP | 7-075173 | 3/1995 |
| JP | 7112301 B | 11/1995 |
| JP | 2002058079 A | 2/2002 |
| JP | 2002271871 A | 9/2002 |
| JP | 2003087881 A | 3/2003 |
| MX | PA/2003000322 A | 11/2003 |
| WO | WO 01/69567 A2 | 9/1991 |
| WO | WO 93/12612 A1 | 6/1993 |
| WO | WO 93/19427 A1 | 9/1993 |
| WO | WO 94/15417 A1 | 7/1994 |
| WO | WO 95/01056 A1 | 1/1995 |
| WO | WO 95/01057 A1 | 1/1995 |
| WO | WO 95/01058 A1 | 1/1995 |
| WO | WO 95/01059 A1 | 1/1995 |
| WO | WO 95/32563 A1 | 11/1995 |
| WO | WO 95/32583 A1 | 11/1995 |
| WO | 9628903 A1 | 9/1996 |
| WO | WO 96/30864 A1 | 10/1996 |
| WO | 96/41448 | 12/1996 |
| WO | 97/23960 | 7/1997 |
| WO | WO 97/33434 A1 | 9/1997 |
| WO | 98/16062 | 4/1998 |
| WO | WO 98/043158 A | 10/1998 |
| WO | WO 98/44477 A1 | 10/1998 |
| WO | WO 99/04568 A1 | 1/1999 |
| WO | WO 99/34564 A1 | 7/1999 |
| WO | 00/17738 | 3/2000 |
| WO | 00/28436 | 5/2000 |
| WO | WO 00/34851 A1 | 6/2000 |
| WO | WO 03/044684 A1 | 5/2003 |
| WO | WO 03/045107 A1 | 5/2003 |
| WO | WO 03/060804 A1 | 7/2003 |
| WO | WO 03/100553 A2 | 12/2003 |

OTHER PUBLICATIONS

Ciarcia, S., *The Best of Ciarcia's Circuit Cellar*, pp. 345-354 (1987).
Konstan, J. A., "State problems in programming human-controlled devices," *Digest of Tech. Papers of Int Conf. on Consumer Electronics (ICCE)*, pp. 122-123 (1994).
Press Release: "Philipis Revolutionizes Home Theatre Control"; 1998, 3 pages.
"ProntoEdit User Manual"; 2002, http://www.pronto.philips.com/index.cfm?id=241, 85 pages.
"Pronto Review"; www.remotecentral.com/pronto/index.html, 3 pages.
Pronto link to downloadable files for components from different manufacturers; http://www.remotecentral.com/files/index.html, 3 pages.
Radio Shack, *Universal Remote Control Owners Manual*, pp. 1-19, (1987).
U.S. Appl. No. 09/519,546, filed Mar. 6, 2000, Ekkel et al.
Cooper, Ian and Royston Shufflebotham, "PDA Web Browsers: Implementation Issues," Computing Laboratory, The University of Kent at Canterbury, Nov. 9, 1995, pp. 1-12.
Full House Control Corp., The RF Base Station. [online] 1997. [retrieved on Apr. 29, 1998]. Retrieved from the Internet: <URL: www.fullhouse.com/base.html>.
Full House Control Corp., The RHOC, [online] 1997. [retrieved on Apr. 29, 1998]. Retrieved from the Internet: <URL: www.fullhouse.com/rhoc.html>.
Full House Control Corp,, RHOC for Windows [online] 1997. [retrieved on Apr. 29, 1998]. Retrieved from the Internet: <URL: www.fullhouse.com/rhocwin.html>.
Giannopoulos, Vassilis, "Efficient VHDL Models for Various PLD Architectures," Thesis: Department of Engineering, College of Engineering, Rochester Institute of Technology, Sep. 1995.
Inoue, et al., "A Home Automation System," *IEEE Transactions on Consumer Electronics*, vol. CE-31, No. 3, Aug. 1985, pp. 516-527.
Kuuluvainen, et al., "The Action-State Diagram: A Compact Finite State Machine Representation for User Interfaces and Small Embedded Reactive Systems," *IEEE Transactions on Consumer Electronics*, vol. 37, No, 3, Aug. 1991, pp. 651-658.
La Porta et al., "Challenges for Nomadic Computing: Mobility Management and Wireless Communication," Bell Laboratories, 1996, pp. 1-24.
Lexicon, Inc., Product Brochure for *Lexicon 500T*Product, 1994.
Murata et al., "A Proposal for Standardization of Home Bus System for Home Automation," *IEEE Transactions on Consumer Electronics*, vol. CE-29, No. 4, Nov. 1983, pp. 524-530.
Niles Audio Corporation, Inc., Product Brochure for *Intellicontrol* Product, 1996.
Philips Electronics N.V., "The Pronto Legend: An Overview of Our Legacy Products," [online] No Date Given [retrieved on Feb. 16, 2012]. Retrieved from the Internet: <URL: www.pronto.philips.com/Products/Archive>.
Philips Electronics N.V., "Pronto User Guide," No Date Given.
Philips Electronics N.V., "Pronto Universal Intelligent Remote Control: User Guide"; No Date Given.
Philips Electronics N.V., "ProntoEdit User Guide," Version 1.02, Oct. 1999.
Philips Electronics N.V., "ProntoEdit User Guide," Version 2.0, Sep. 2000.
Tonks, Daniel, "Philips Award-Winning Pronto Remote Now Offers More Control for Home Entertainment Systems"; [online] Remote Central.com, 1998 [retrieved on Feb. 16, 2012]. Retrieved from the Internet: <URL:www.remotecentral.com/pronto/pedit>.
Tonks, Daniel, "Pronto TS1000 Features"; [online] Remote Central.com, No Date Given [retrieved on Feb. 16, 2012]. Retrieved from the Internet: <URL:www.remotecentral.com/pronto/features>.

(56) References Cited

OTHER PUBLICATIONS

Tonks, Daniel, "Philips Pronto TS-1000 Remote Control Review 1"; [online] Remote Central.com, No Date Given [retrieved on Feb. 16, 2012]. Retrieved from the Internet: <URL:www.remotecentral.com/pronto/index>.
Tonks, Daniel, "Philips Pronto TS-1000 Remote Control Review 2"; [online] Remote Central.com, No Date Given [retrieved on Feb. 16, 2012]. Retrieved from the Internet: <URL:www.remotecentral.com/pronto/index1>.
Tonks, Daniel, "Philips Pronto TS-1000 Remote Control Review 3"; [online] Remote Central.com, No Date Given [retrieved on Feb. 16, 2012]. Retrieved from the Internet: <URL:www.remotecentral.com/pronto/software.htm>.
Tonks, Daniel, "Philips Pronto TS-1000 Remote Control Review 4"; [online] Remote Central.com, No Date Given [retrieved on Feb. 16, 2012]. Retrieved from the Internet: <URL: www.remotecentral.com/pronto/softw1.htm>.
Tonks, Daniel, "Philips Pronto TS-1000 Remote Control Review 5"; [online] Remote Central.com, No Date Given [retrieved on Feb. 16, 2012]. Retrieved from the Internet: <URL: www.remotecentral.com/pronto/second>.
Tonks, Daniel, "Philips Pronto TS-1000 vs Marantz RC5000/RC5000i FAQ"; [online] Remote Central.com, No Date Given [retrieved on Feb. 16, 2012]. Retrieved from the Internet: <URL:www.remotecentral.com/pronto/rc5faq.htm>.
Tritton, "Interactive Home Systems (IHS)—An Overview," *IEEE Transactions on Consumer Electronics*, vol, 34, No. 3, Aug. 1988, pp. 694-699.
*Universal Electronics Inc.* v. *Logitech Inc., Logitech International S.A. and Logitech Europe S. A.*, "Logitech Europe S.A.'s Disclosure of Asserted Claims and Infringement Contentions Pursuant to Patent L.R. 3-1," United States District Court Central District of California— Southern Division, Case No. SACV11-1056-JVS(Anx), Dec. 19, 2011.
*Universal Electronics Inc.* v. *Logitech Inc., Logitech International S.A. and Logitech Europe S.A.*, "Logitech Europe S.A.'s Disclosure of Asserted Claims and Infringement Contentions Pursuant to Patent L.R. 3-1 Exhibit 4: Infringment Contentions for U.S. Patent No. 6,784,805," United States District Court Central District of California—Southern Division, Case No. SACV11-1056-JVS(Anx), Dec. 19, 2011.
*Universal Electronics Inc.* v. *Logitech Inc., Logitech International S.A. and Logitech Europe S. A.*, "Universal Electronics Inc.'s Invalidity Contentions," United States District Court Central District of California—Southern Division, Case No. SACV11-1056-JVS(Anx), Februay 17, 2012.
*Universal Electronics Inc.* v. *Logitech Inc., Logitech International S.A. And Logitech Europe S. A.*, "Universal Electronics Inc.'s Invalidity Contentions Exhibit A: Invalidity of U.S, Patent No. 5,410,326," United States District Court Central District of California—Southern Division, Case No. SACV11-1056-JVS(Anx), Feb. 17, 2012.
*Universal Electronics Inc.* v. *Logitech Inc., Logitech International S.A. and Logitech Europe S. A.*, "Joint Claim Construction and Prehearing Statement Pursuant to N.D. Cal. Patent Local Rule 4-3," United States District Court Central District of California—Southern Division, Case No. SACV11-1056-JVS(Anx), Apr. 23, 2012.
*Universal Electronics Inc.* v. *Logitech Inc., Logitech International S.A. and Logitech Europe S. A.*, "Exhibit B (Logitech Patents): Disputed Terms, Proposed Constructions and Intrinsic and Extrinsic Evidence," United States District Court Central District of California—Southern Division, Case No. SACV11-1056-JVS(Anx), Apr. 23, 2012.
*Universal Electronics Inc.* v. *Logitech Inc., Logitech International S.A. and Logitech Europe S. A.*, "Exhibit A-H: Logitech Means-Plus-Function Chart for U,S. Patent Nos. 5,255,313, 5,228,077, 5,414,761," United States District Court Central District of California—Southern Division, Case No. SACV11-1056-JVS(Anx), Apr. 27, 2012.
*Universal Electronics Inc.* v. *Logitech Inc., Logitech International S.A. and Logitech Europe S. A.*, "Supplemental/Amended Joint Claim Construction and Prehearing Statement Pursuant to N.D. Cal. Patent Local Rule 4-3," United States District Court Central District of California—Southern Division, Case No. SACV11-1056-JVS(Anx), May 11, 2012.
*Universal Electronics Inc.* v. *Logitech Inc., Logitech International S.A. and Logitech Europe S. A.*, "Supplemental/Amended Joint Claim Construction and Prehearing Statement Pursuant to N.D. Cal. Patent Local Rule 4-3 Exhibit B (Logitech Patents): Disputed Terms, Proposed Constructions, and Intrinsic and Extrinsic Evidence," United States District Court Central District of California—Southern Division, Case No. SACV11-1056-JVS(Anx), May 11, 2012.
*Universal Electronics Inc.* v. *Logitech Inc., Logitech International S.A. and Logitech Europe S. A.*, "Universal Electronics Inc.'s Opening Claim Construction Brief," United States District Court Central District of California —Southern Division, Case No. SACV11-1056-JVS(Anx), May 11, 2012.
*Universal Electronics Inc.* v. *Logitech inc., Logitech International S.A. and Logitech Europe S. A.*, "Universal Electronics Inc.'s Opening Claim Construction Brief Exhibit C: Independent Asserted Claims in which the Parties Dispute One or More Claim Terms," United States District Court Central District of California—Southern Division, Case No. SACV11-1056-JVS(Anx), May 11, 2012.
*Universal Electronics Inc.* v. *Logitech Inc., Logitech International S.A. and Logitech Europe S. A.*, "Universal Electronics Inc.'s Opening Claim Construction Brief Exhibit D: Claim Chart of UEI's Proposed Constructions & Logitech's Proposed Constructions," United States District Court Central District of California—Southern Division, Case No. SACV11-1056-JVS(Anx), May 11, 2012.
*Universal Electronics Inc.* v. *Logitech Inc., Logitech International S,A. and Logitech Europe S. A.*, "Declaration of James J. Lukas, Jr. In Support of Universal Electronics Inc.'s Opening Claim Construction Brief," United States District Court Central District of California—Southern Division, Case No. SACV11-1056-JVS(Anx), May 11, 2012.
*Universal Electronics Inc.* v. *Logitech Inc., Logitech International S,A. and Logitech Europe S. A.*, "Declaration of James J. Lukas, Jr. in Support of Universal Electronics Inc.'s Opening Claim Construction Brief Exhibit 8: U.S. Patent No. 6784,805," United States District Court Central District of California— Southern Division, Case No. SACV11-1056-JVS(Anx), May 11, 2012.
*Universal Electronics Inc.* v. *Logitech Inc., Logitech International S.A. and Logitech Europe S. A.*, "Declaration of James J. Lukas, Jr. In Support of Universal Electronics Inc.'s Opening Claim Construction Brief Exhibit 17a: The Prosecution History of U.S. Patent No. 6,784,805 (Part 2)," United States District Court Central District of California —Southern Division, Case No. SACV11-1056-JVS(Anx), May 11, 2012.
*Universal Electronics Inc.* v. *Logitech Inc., Logitech International S,A. and Logitech Europe S. A.*, "Declaration of James J. Lukas, Jr. in Support of Universal Electronics Inc.'s Opening Claim Construction Brief Exhibit 17b: The Prosecution History of U.S. Patent No. 6,784,805 (Part 1)," United States District Court Central District of California—Southern Division, Case No. SACV11-1056-JVS(Anx), May 11, 2012.
*Universal Electronics Inc.* v. *Logitech Inc., Logitech International S,A. and Logitech Europe S. A.*, "Declaration of James J. Lukas, Jr. in Support of Universal Electronics Inc.'s Opening Claim Construction Brief Exhibit 19: Various Dictionary Entries Contained in *Webster's Third New International Dictionary*, Unabridged," United States District Court Central District of California—Southern Division, Case No. SACV11-1056-JVS(Anx), May 11, 2012.
*Universal Electronics Inc.* v. *Logitech Inc., Logitech International S.A. and Logitech Europe S. A.*, "Logitech, Inc., Logitech International S.A. and Logitech Europe S.A.'s Opening Claim Construction Brief," United States District Court Central District of California—Southern Division, Case No. SACV11-1056-JVS(Anx), May 11, 2012.
*Universal Electronics Inc.* v. *Logitech Inc., Logitech International S.A. and Logitech Europe S. A.*, "Declaration of Robert J. Artuz in Support of Logitech, Inc., Logitech International S.A. and Logitech Europe S.A.'s Opening Claim Construction Brief," United States District Court Central District of California —Southern Division, Case No. SACV11-1056-JVS(Anx), May 11, 2012.

(56) References Cited

OTHER PUBLICATIONS

*Universal Electronics Inc. v. Logitech Inc., Logitech International S.A. and Logitech Europe S. A.*, "Declaration of Robert J. Artuz in Support of Logitech, Inc., Logitech International S.A. and Logitech Europe S.A.'s Opening Claim Construction Brief Exhibit 7: U.S. Patent No. 6,784,805," United States District Court Central District of California—Southern Division, Case No. SACV11-1056-JVS(Anx), May 11, 2012.

*Universal Electronics Inc. v. Logitech Inc., Logitech International S.A. and Logitech Europe S. A.*, "Declaration of Robert J. Artuz in Support of Logitech, Inc., Logitech International S.A. and Logitech Europe S.A.'s Opening Claim Construction Brief Exhibit 25: Application Excerpts (Mar. 1, 2001, pp. 17-19) from the Prosecution Histoty of U.S. Patent No. 6,784,805," United States District Court Central District of California—Southern Division, Case No. SACV11-1056-JVS(Anx), May 11, 2012.

*Universal Electronics Inc. v. Logitech Inc., Logitech International S.A. and Logitech Europe S. A.*, "Declaration of Robert J. Artuz in Support of Logitech, Inc., Logitech International S.A. and Logitech Europe S.A.'s Opening Claim Construction Brief Exhibit 26: Office action Excerpts (Sep. 25, 2003, pp. 4-6) from the Prosecution History of U.S. Patent No, 6,784,805," United States District Court Central District of California—Southern Division, Case No. SACV11-1056-JVS(Anx), May 11, 2012.

*Universal Electronics Inc. v. Logitech Inc., Logitech International S.A. and Logitech Europe S. A.*, "Declaration of Robert J. Artuz in Support of Logitech, Inc., Logitech International S.A. and Logitech Europe S.A.'s Opening Claim Construction Brief Exhibit 27: Applicant's Response Excerpts (Dec. 4, 2003, pp. 9, 11-15, 17-18) from the Prosecution History of U.S. Patent No. 6,784,805," United States District Court Central District of California— Southern Division, Case No. SACV11-1056-JVS(Anx), May 11, 2012.

*Universal Electronics Inc. v. Logitech Inc., Logitech International S.A. and Logitech Europe S. A.*, "Logitech, Inc., Logitech International S.A., and Logitech Europe S.A.'s Response to Universal Electronics Inc.'s Opening Claim Construction Brief," United States District Court Central District of California—Southern Division, Case No. SACV11-1056-JVS(Anx), Jun. 15, 2012.

*Universal Electronics Inc. v. Logitech Inc., Logitech International S.A. and Logitech Europe S. A.*, "Universal Electronics Inc.'s Responsive Claim Construction Brief," United States District Court Central District of California—Southern Division, Case No. SACV11-1056-JVS(Anx), Jun. 15, 2012.

*Universal Electronics Inc. v. Logitech Inc., Logitech International S.A. and Logitech Europe S. A.*, "Declaration of James J. Lukas, Jr. in Support of Universal Electronics Inc.'s Responsive Claim Construction Brief," United States District Court Central District of California—Southern Division, Case No. SACV11-1056-JVS(Anx), Jun. 15, 2012.

Voelker et al., "Mobisaic: An Information System for a Mobile Wireless Computing Environment," *WMCSA '94 Proceedings of the 1994 First Workshop on Mobile Computing Systems and Applications*, 1994.

Yannakakis et al., "Testina Finite State Machines," *ACM* 089791-397-3/91/0004/0475, 1991, pp. 476-485.

Zeisel, et al., "An Interactive Menu-Driven Remote Control Unit for TV—Receivers and VC-Recorders," *IEEE Transactions on Consumer Electronics*, vol. 34, No. 3, Aug. 1988, pp. 814-818.

International Search Report for PCT/CA01/00323 mailed on Apr. 4, 2002; 7 pages.

\* cited by examiner

STATE-BASED REMOTE CONTROL SYSTEM

This application is a continuation of abandoned U.S. Patent Application No. 11/841,753, filed Aug. 20, 2007, titled "State-Based Remote Control System", of Glen McLean Harris et al., which is a continuation of U.S. Patent Application No. 11/411,398, filed Apr. 25, 2006, now U.S. Pat. No. 8,531,276 titled "State-Based Remote Control System" of Glen McLean Harris et al., which is a continuation of U.S. Patent Application No. 10,870,339, filed Jun. 16, 2004 (now U.S. Patent No. 8,026,789), titled "State-Based Remote Control System," of Glen McLean Harris et al., which is a continuation of U.S. Patent Application No. 09/804,718, (U.S. Patent No. 6,784,805), filed Mar. 12, 2001, titled "State-Based Remote Control System," of Glen McLean Harris et al., which claims the benefit of expired U.S. Provisional Patent Application No. 60/253,727, filed Nov. 29, 2000, titled "State-Based Remote Control System," of Glen McLean Harris et al. and claims the benefit of expired U.S. Provisional Patent Application No. 60/189,487, filed Mar. 15, 2000, titled "System, Method and Apparatus for an Internet Enabled User Interaction Device", of Glen McLean Harris et al. each of which is incorporated by reference herein in its entirety for all purposes.

BACKGROUND OF THE INVENTION

1. Field of the Invention

The present invention relates generally to remote control devices and more specifically it relates to a state-based remote control system for providing efficient and simple operation of a plurality of electronic devices as a coordinated system based upon an overall task.

2. Description of the Prior Art

Remote control devices have been in use for years. Remote control devices are utilized to operate various external electronic devices including but not limited to televisions, stereos, receivers, VCRs°, DVD players, CD players, amplifiers, equalizers, tape players, cable units, lighting, window shades and other electronic devices. A conventional remote control is typically comprised of a housing structure, a keypad within the housing structure for entering commands by the user, electronic circuitry within the housing structure connected to the keypad, and a transmitter electrically connected to the electronic circuitry for transmitting a control signal to an electronic device to be operated.

The user depresses one or more buttons upon the keypad when a desired operation of a specific electronic device is desired. For example, if the user desires to turn the power off to a VCR, the user will depress the power button upon the remote control which transmits a "power off" control signal that is detected by the VCR resulting in the VCR turning off.

Because of the multiple electronic devices currently available within many homes and businesses today, a relatively new type of remote control is utilized to allow for the control of a plurality of electronic devices commonly referred to as a "universal remote control." Most universal remote controls have "selector buttons" that are associated with the specific electronic device to be controlled by the remote control (i.e., television, VCR, DVD player, etc.).

Example: A few universal remote controls allow for "macros" to be programmed into the remote control so that when a preprogrammed button is depressed a string of commands is executed as programmed. For example, if the user desires to operate their television along with the stereo receiving input from the television, the user would program a macro for turning on the television, turning on the stereo and then switching the input to the stereo for receiving audio input from the television. The main problem with conventional universal remote controls is that they are unable to detect or monitor the state of a particular electronic device. Another problem with conventional universal remote controls is that when a preprogrammed macro is executed, an undesirable effect can occur wherein electronic devices that are desired to be turned on are actually turned off. For example, if the television is already on but the stereo is tuned to a .local radio station and the user selects the above macro the power to the television would actually be turned off instead of maintained on.

Recently, universal remote controls have been developed that communicate via radio frequency (RF) with external sensing devices that are connected to the electronic devices for detecting the current state of the electronic device. Other remote controls are able to receive and display information from the electronic device they control such as displaying the name of a radio station on a display of the remote. These devices are relatively expensive and again difficult to utilize for the average consumer.

The main problem with conventional remote control devices is that they are typically unable to know the particular "state" of an electronic device they are to control, particularly universal remote controls. A further problem with conventional remote controls that do allow for advanced configuration thereof to compensate for the various states of the electronic device is that they are often times difficult for the average consumer to utilize. Another problem with conventional remote control devices is that they force consumers to heir electronic devices "individually" (i.e., turn television on, turn stereo on, switch audio input on stereo to television) rather than in broad "tasks" (e.g., watch television).

While these devices may be suitable for the particular purpose to which they address, they are not as suitable for providing efficient and simple operation of a plurality of electronic devices as a coordinated system based upon an overall task. Conventional remote controls are typically programmed to operate only one electronic device. Conventional universal remote controls are typically programmed to operate electronic devices "individually" or are difficult to configure to automated control of a plurality of electronic devices.

In these respects, the state-based remote control system according to the present invention substantially departs from the conventional concepts and designs of the prior art, and in so doing provides an apparatus primarily developed for the purpose of providing efficient and simple operation of a plurality of electronic devices as a coordinated system based upon an overall task.

BRIEF SUMMARY OF THE INVENTION

In view of the foregoing disadvantages inherent in the known types of remote controls now present in the prior art, the present invention provides a new state-based remote control system construction wherein the same can be utilized for providing efficient and simple operation of a plurality of electronic devices as a coordinated system based upon an overall task.

The general purpose of the present invention, which will be described subsequently in greater detail, is to provide a new state-based remote control system that has many of the advantages of the remote controls mentioned heretofore and many novel features that result in a new state-based remote control system which is not anticipated, rendered obvious, suggested, or even implied by any of the prior art remote controls, either alone or in any combination thereof.

To attain this, the present invention generally comprises a housing, a keypad in communication with an electronic system contained within the housing, and a communication device in communication with the electronic system for communicating with external electronic devices. The electronic system constantly monitors the buttons selected by a user to determine the state of all external electronic devices that are to be controlled. When the user selects a task (e.g., watch television), the electronic system automatically determines the actions required to achieve the desired task based upon the current state of the external electronic devices. After the task has been fulfilled, the electronic system updates the data to reflect the modified state of the external electronic devices.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a state-based remote control system that will overcome the shortcomings of the prior art devices.

A second object is to provide a state-based remote control system for providing efficient and simple operation of a plurality of electronic devices as a coordinated system based upon an overall task.

Another object is to provide a state-based remote control system that provides for intuitive operation of a plurality of electronic devices.

An additional object is to provide a state-based remote control system that allows for the simple operation of a plurality of electronic devices based upon an 25 overall "task" instead of specific controls for specific electronic devices.

A further object is to provide a state-based remote control system that is simple and easy to utilize for the average consumer.

Another object is to provide a state-based remote control system that does not require significant programming prior to usage.

An additional object is to provide a state-based remote control system that is affordable.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
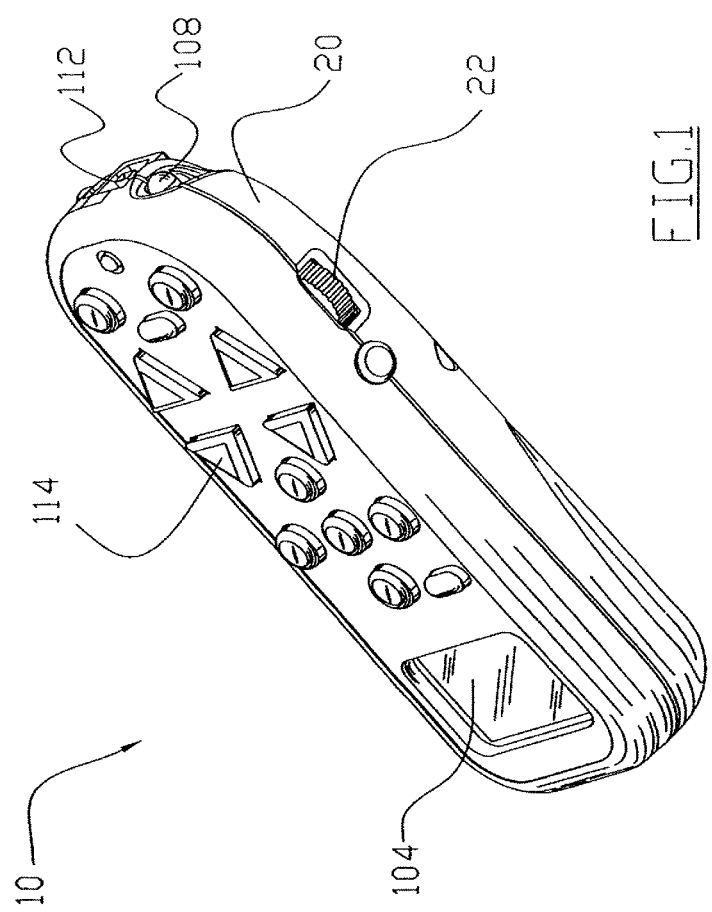
FIG. 1 is an upper perspective view of the present invention.
Figure 2:
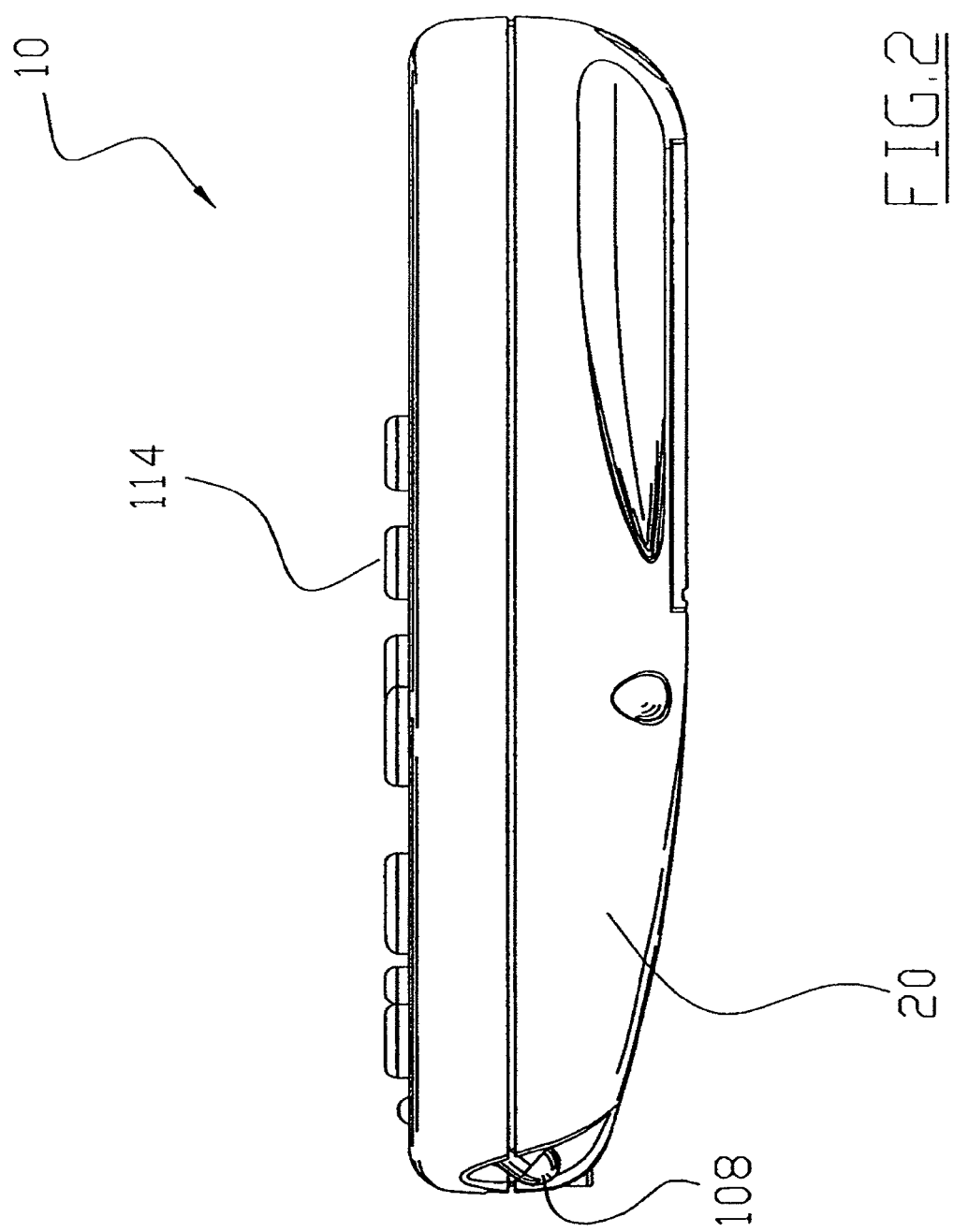
FIG. 2 is a side view of the present invention.
Figure 3:
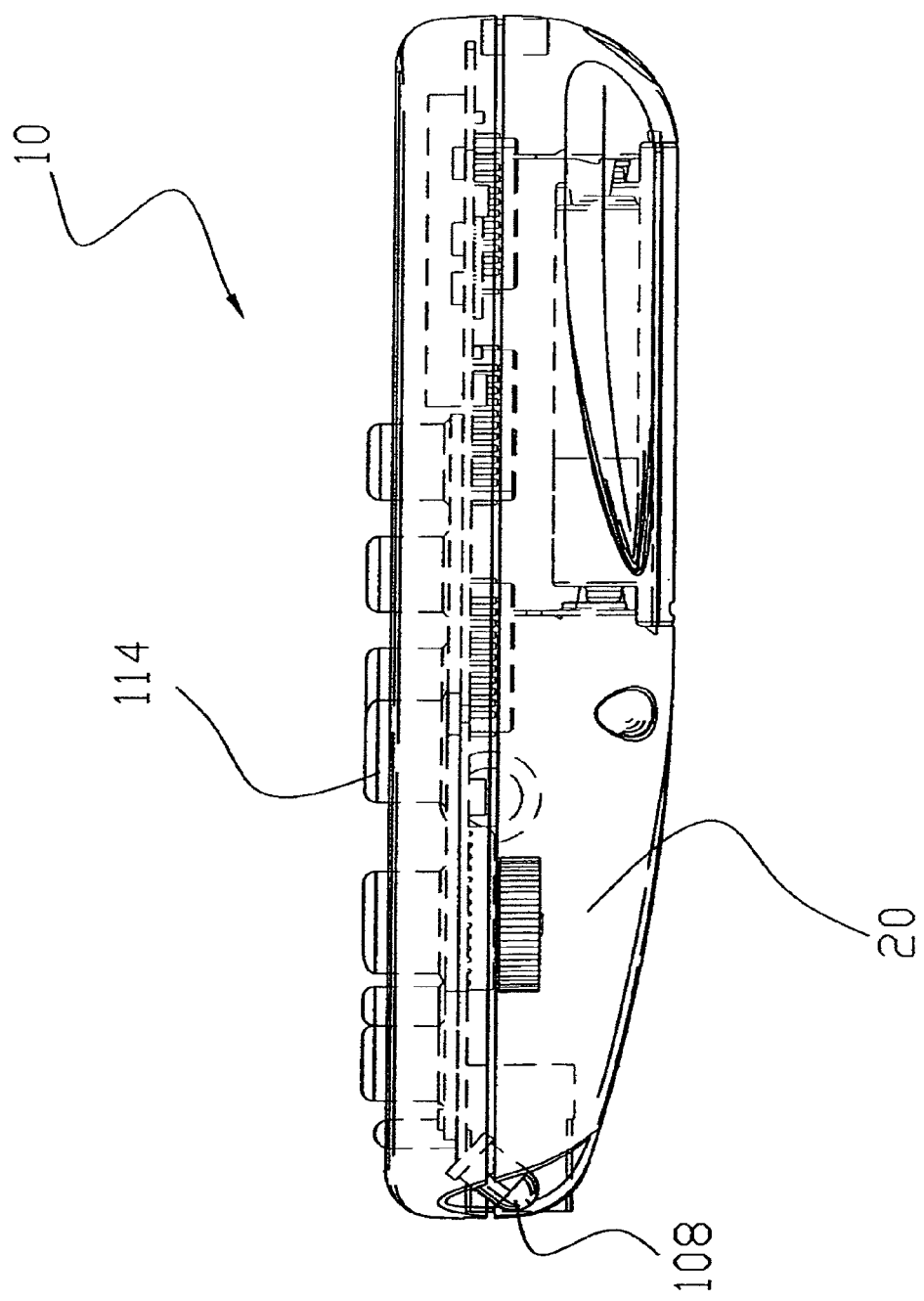
FIG. 3 is a side view of the present invention illustrating electronic circuitry within.
Figure 4:
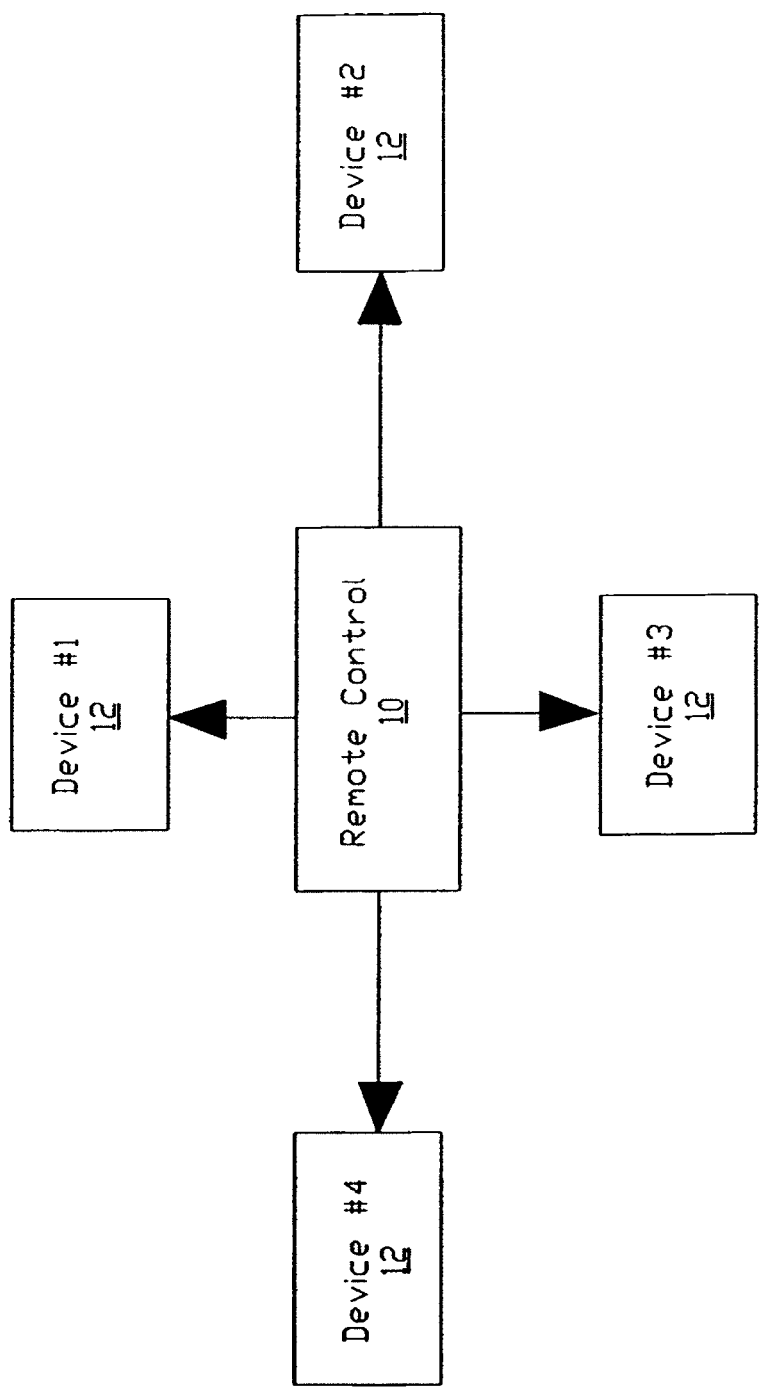
FIG. 4 is a block diagram illustrating the communications between the present invention and a plurality of external electronic devices.
Figure 5:
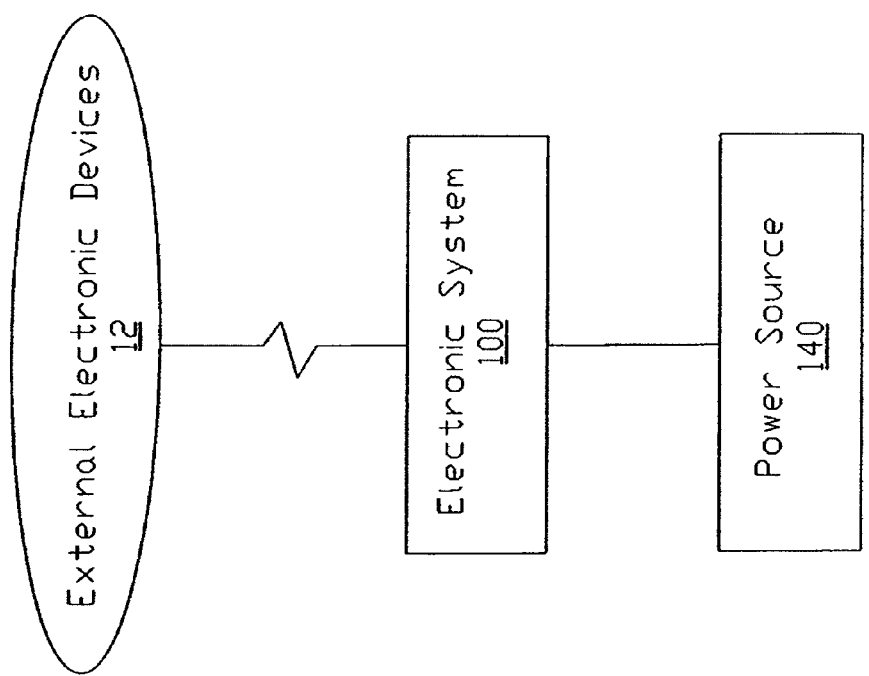
FIG. 5 is a block diagram illustrating the electronic system of the present invention electrically connected to the power source and in communication with the external electronic devices.

Turning now descriptively to the drawings, in which similar reference characters denote similar elements throughout the several views, FIGS. 1 through 11 illustrate a state-based remote control system 10, which comprises a housing 20, a keypad 114 in communication with an electronic system 100 contained within the housing 20, and a communication device 108 in communication with the electronic system 100 for communicating with external electronic devices 12. The electronic system 100 constantly monitors the buttons of the keypad 114 and other switches selected by a user to determine the state of all external electronic devices 12 that are to be controlled. When the user selects a task (e.g., watch television), the electronic system 100 automatically determines the actions required to achieve the desired task based upon the current state of the external electronic devices 12. After the task has been fulfilled, the electronic system 100 updates the data to reflect the modified state of the external electronic devices 12.

A. Housing Structure

The present invention generally is comprised of a housing 20 having a structure and shape similar to conventional remote control devices. The housing 20 may be constructed of various types of materials and shapes as can be appreciated by one skilled in the art. The housing is preferably structured to be ergonomic for a majority of users.

B. Electronic System

The present invention is utilized to control and operate various external electronic devices including but not limited to televisions, stereos, receivers, VCRs, DVD players, CD players, amplifiers, equalizers, tape players, cable units, satellite dish receivers, lighting, window shades and other electronic devices. Almost any number of external electronic devices may be controlled by the present invention as will be discussed in further detail.

Figure 6:
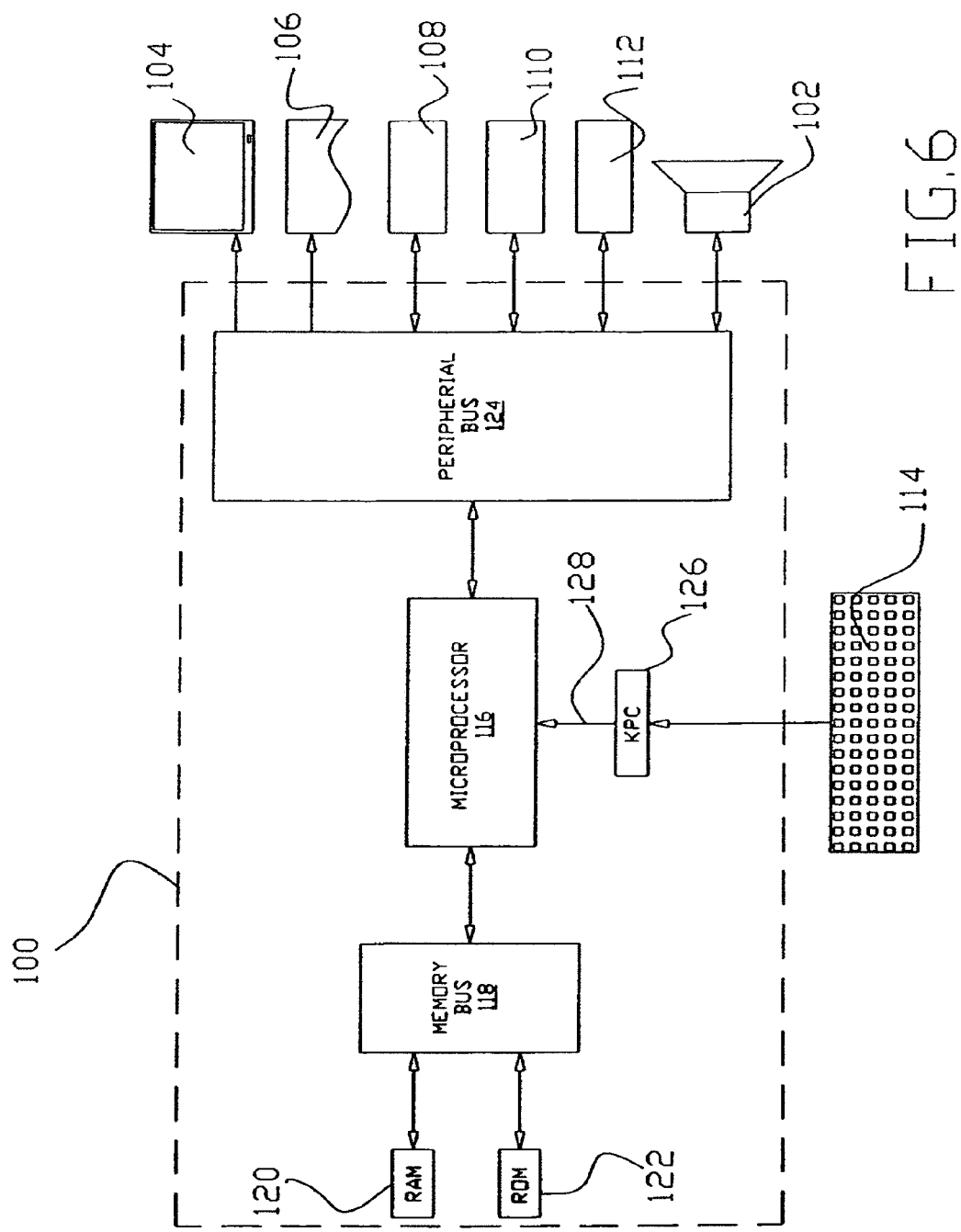
FIG. 6 is a block diagram illustrating the electronic system along with a plurality of accessory devices connected to thereof.

FIG. 6 is a block diagram of an exemplary electronic system 100 for practicing the various aspects of the present invention. The electronic system 100 is preferably enclosed within the housing. A portable power source 140 is electrically connected to the electronic system 100 for providing electrical power to the electronic system 100. The power source 140 may be comprised of any power source such as a battery structure (disposable or rechargeable), solar cells, or direct power.

The electronic system 100 preferably includes a display screen 104, a network interface 112, a keypad 114, a microprocessor 116, a memory bus 118, random access memory (RAM) 120, a speaker 102, read only memory (ROM) 122, a peripheral bus 124, a keypad controller 126, and a communications device 108. As can be appreciated, the electronic system 100 of the present invention may be comprised of any combination of well-known computer devices, personal digital assistants (PDAs), laptop computers, remote control devices and other similar electronic structures.

The microprocessor 116 is a general-purpose digital processor that controls the operation of the electronic system 100. The microprocessor 116 can be a single-chip processor or implemented with multiple components. Using instructions retrieved from memory, the microprocessor 116 controls the reception and manipulations of input data and the output and display of data on output devices.

The memory bus 118 is utilized by the microprocessor 116 to access RAM 120 and ROM 122. RAM 120 is used by microprocessor 116 as a general storage area and as scratch-pad memory, and can also be used to store input data and processed data. ROM 122 can be used to store instructions or program code followed by microprocessor 116 as well as other data.

Peripheral bus 124 is used to access the input, output and storage devices used by the electronic system 100. In the described embodiment(s), these devices include a display screen 104, an accessory device 106, a speaker 102, a communications device 108, and a network interface 112. A keypad controller 126 is used to receive input from the keypad 114 and send decoded symbols for each pressed key to microprocessor 116 over bus 128.

The display screen 104 is an output device that displays images of data provided by the microprocessor 116 via the peripheral bus 124 or provided by other components in the electronic system 100. Other output devices such as a printer, plotter, typesetter, etc. can be utilized as an accessory device 106.

The microprocessor 116 together with an operating system operate to execute computer code and produce and use data. The computer code and data may reside on RAM 120, ROM 122, or other storage mediums. The computer code and data could also reside on a removable program medium and loaded or installed onto the electronic system 100 when needed. Removable program mediums include, for example, PC-CARD, flash memory, and floppy disk.

The network interface 112 is utilized to send and receive data over a network connected to other electronic systems. The network interface may be comprised of a Universal Serial Bus (USB), an external bus standard that supports data transfer rates of 12 Mbps (12 million bits per second). A single USB port can be used to connect up to 127 peripheral devices, such as mice, modems, and keyboards. An interface card or similar device and appropriate software implemented by microprocessor 116 can be utilized to connect the electronic system 100 to an existing network and transfer data according to standard protocols including data over a global computer network such as the Internet.

The keypad 114 is used by a user to input commands and other instructions to the electronic system 100. Other types of user input devices can also be used in conjunction with the present invention. For example, pointing devices such as a computer mouse, a jog switch 22, a track ball, a stylus, or a tablet to manipulate a pointer on a screen of the electronic system 100.

The present invention can also be embodied as computer readable code on a computer readable medium. The computer readable medium is any data storage device that can store data which can be thereafter be read by a electronic system. Examples of the computer readable medium include read-only memory, random-access memory, magnetic data storage devices such as diskettes, and optical data storage devices such as CD-ROMs. The computer readable medium can also be distributed over a network coupled electronic systems so that the computer readable code is stored and executed in a distributed fashion.

The communications device 108 may be comprised of any well-known communication system that allows communications with external electronic devices. The communications device 108 may provide for various types of communication such as but not limited to via infrared (IR), wireless (e.g., BLUETOOTH), unidirectional, bidirectional, radio frequency (RF), visible light, ultrasonic and various other means for communicating with external electronic devices.

The environmental unit 110 senses environmental information such as lighting, motion, orientation, temperature, audio and other environmental information. The environmental unit 110 communicates the detected environmental information to the microprocessor 116 for consideration in controlling the external electronic devices. The environmental unit 110 includes the appropriate sensors such as light sensors, temperature sensors, sound sensors and other desirable sensors to determine the environment conditions external of the housing.

Input into the electronic system is accomplished mainly through the usage of the keypad 114. The keypad 114 includes a plurality of buttons that allow the user to execute one or more commands. The keypad 114 allows for the control of basic functions such as volume, channel manipulation, mute, and last channel. However, the keypad 114 may also include several buttons that represent a specific task such as watch television, listen to radio and various other tasks. Various other input devices may be utilized to input data into the electronic system such as a jog switch 22 (i.e., dial), motion and orientation detectors, touch sensitive screens and voice recognition. The display 104 provides information to the user such as possible tasks to complete or the current state of the external electronic devices.

C. Initializing/Synchronizing of Electronic System with External Devices

Figure 7:
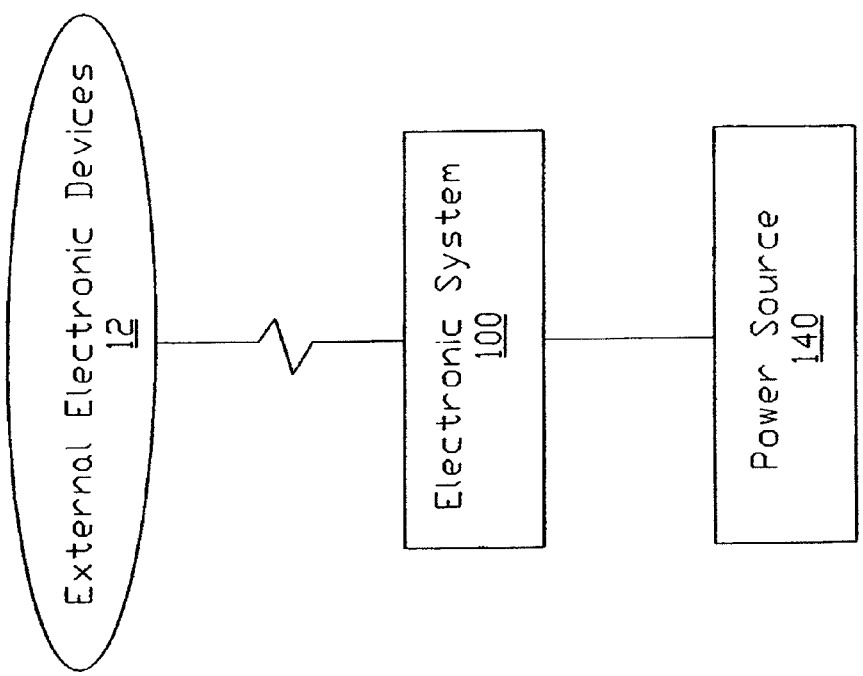
FIG. 7 is a flowchart illustrating the initial programming of the present invention prior to usage.
Figure 8:
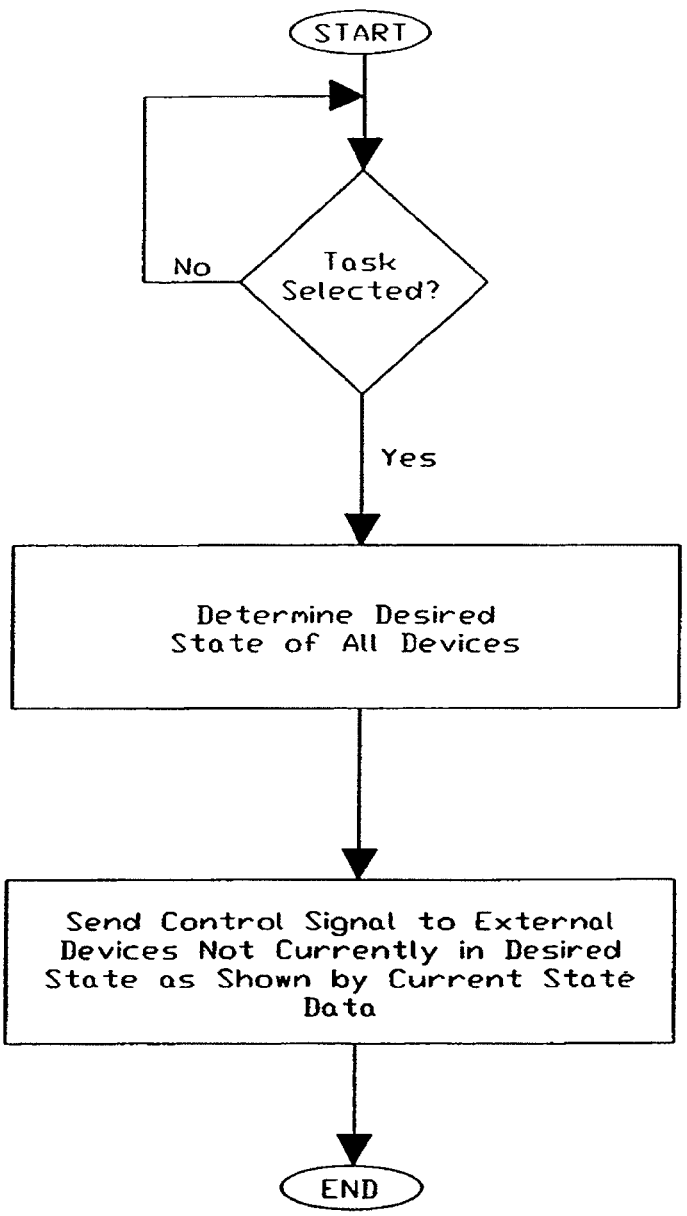
FIG. 8 is a flowchart illustrating the modification of the state of external electronic devices not in the desired state as desired within a task to be performed.

Prior to utilizing the present invention, the user must program the electronic system 100 to not only recognize all of the external electronic devices 12 to be controlled but also as to each external electronic device 12 respective current "states" (i.e., on, off, current input, current output, etc.) as is shown in FIG. 7 of the drawings.

The initial programming of the electronic system 100 may be accomplished through various well-known means such as entering a code for each specific external electronic device. "Sampling" of a signal from a remote control utilized to control a specific electronic device may also be utilized to assist in the programming of the electronic system 100. Various other methods may be utilized to program the electronic system 100 to recognize and control the external electronic devices 12 which are well known in the art.

After all of the external electronic devices 12 have been properly programmed into the electronic system 100, the user then must program the "current state" of each external electronic device into the electronic system 100. This is accomplished typically by the user answering a series of questions shown on the display regarding each display. For example, the display may ask "Is the television turned on?" which the user would respond to. It can be appreciated that there can also be a default state for all of the external devices as being "off." All of the programmed "Current State Data" is stored within memory of the electronic system 100.

D. Current State Data

"Current State Data" is data information relating to the current state of each of the external electronic devices 12 stored within the electronic system 100. The "state" of an external electronic device 12 is comprised of various variables such as but not limited to power on, power off, volume level, mute on, mute off, audio input, audio output, video input, video output, lights on, lights off, shades open, shades closed, and various other states common to external electronic devices 12. The Current State Data is updated as actions and/or tasks are performed to provide an accurate reflection of the actual current state of the external electronic devices 12. The Current State Data is utilized by the electronic. system 100 to determine what external electronic devices 12 require modification when a "task" is selected by the user to prevent undesirable events from occurring.

E. Actions

An "action" is a specific event that occurs that typically only affects one of the external devices. An example of an action is when the user selects the power button on the keypad 114 to turn off the television which causes the television to switch from on to off or vice-versa.

Figure 9:
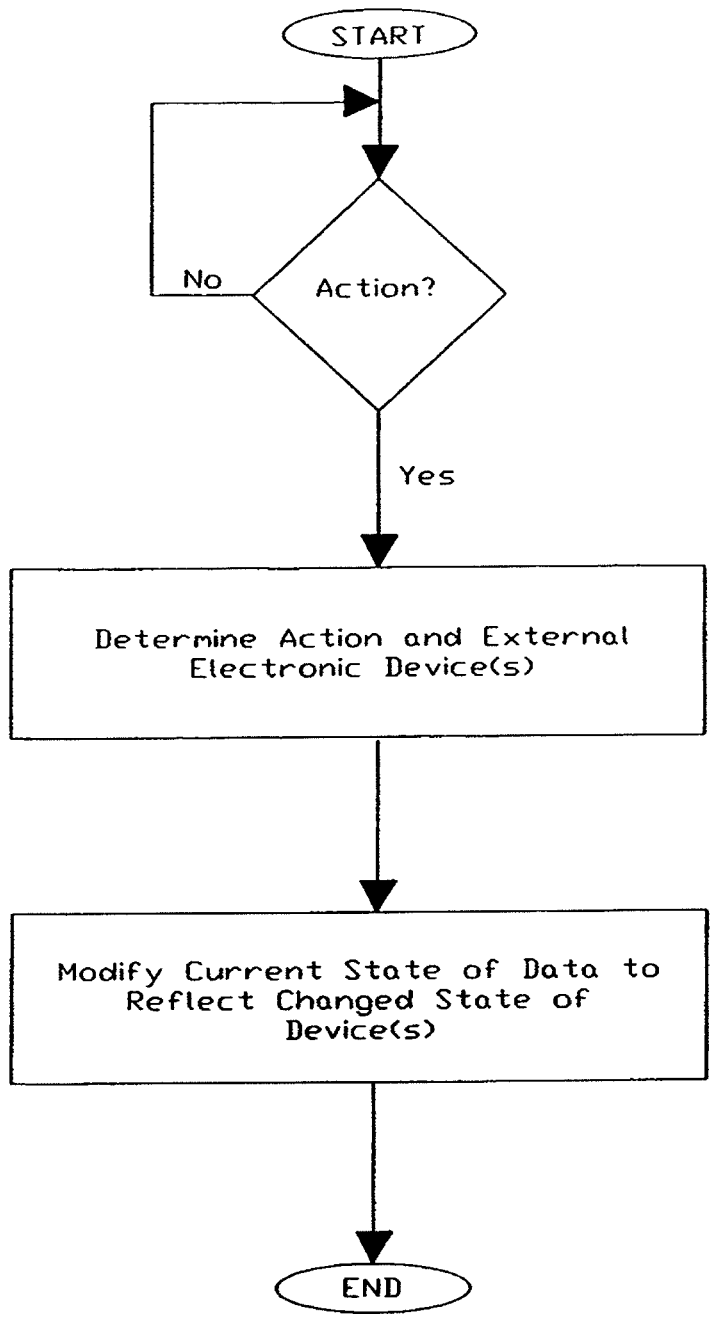
FIG. 9 is a flowchart illustrating an action performed upon one or more external devices and modifying the memory within the electronic system accordingly.
Figure 10:
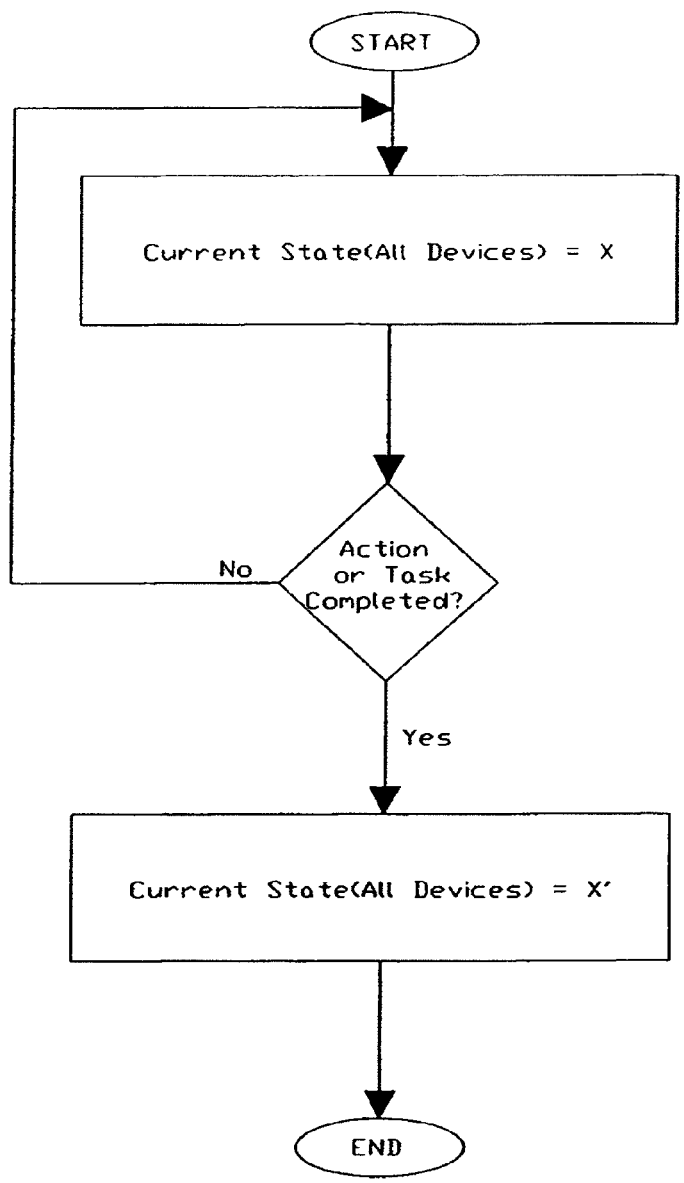
FIG. 10 is a flowchart illustrating the modification of the memory within the electronic system to reflect the changed state of the external electronic devices after a task or an action has been completed.

The Current State Data is immediately modified to reflect the changed state of the television or other external electronic device after an action occurs as shown in FIGS. 9 and 10 of the drawings. The Current State Data is constantly updated to maintain an accurate reflection of the actual current state of the external electronic devices 12.

F. Tasks

A "task" may be comprised of one or more "actions" depending upon (1) the desired state of all external devices as prescribed by the task, and (2) the current state of all external devices. Examples of tasks are "watch television," "listen to radio," "watch video," "listen to CD's," "watch DVD", and so forth. There are many more tasks that may accomplished with the present invention that are not discussed but are deemed readily apparent to one skilled in the art.

Each task has a "desired state" for each of the external electronic devices 12. When a task is selected, either through the keypad or the display, the electronic system 100 immediately determines the Current State Data and compares this data to the "Desired State Data" for all of the external electronic devices 12. After determining which external electronic devices 12 are in the desired state and which are not in the desired state, the electronic system 100 transmits a communication signal to the external electronic devices 12 that are not in the desired state to switch to the desired state based upon the task to be performed.

Another function of the present invention is to allow for the electronic system 100 to determine what menu options (i.e., "tasks") that are available upon the display 104 based upon the current state of the external electronic devices 12. For example, if the television is currently on, the menu within the display may display the "Turn Television Off" task instead of the "Turn Television On" task which is not required.

G. Watch Television Task Example

Figure 11A:
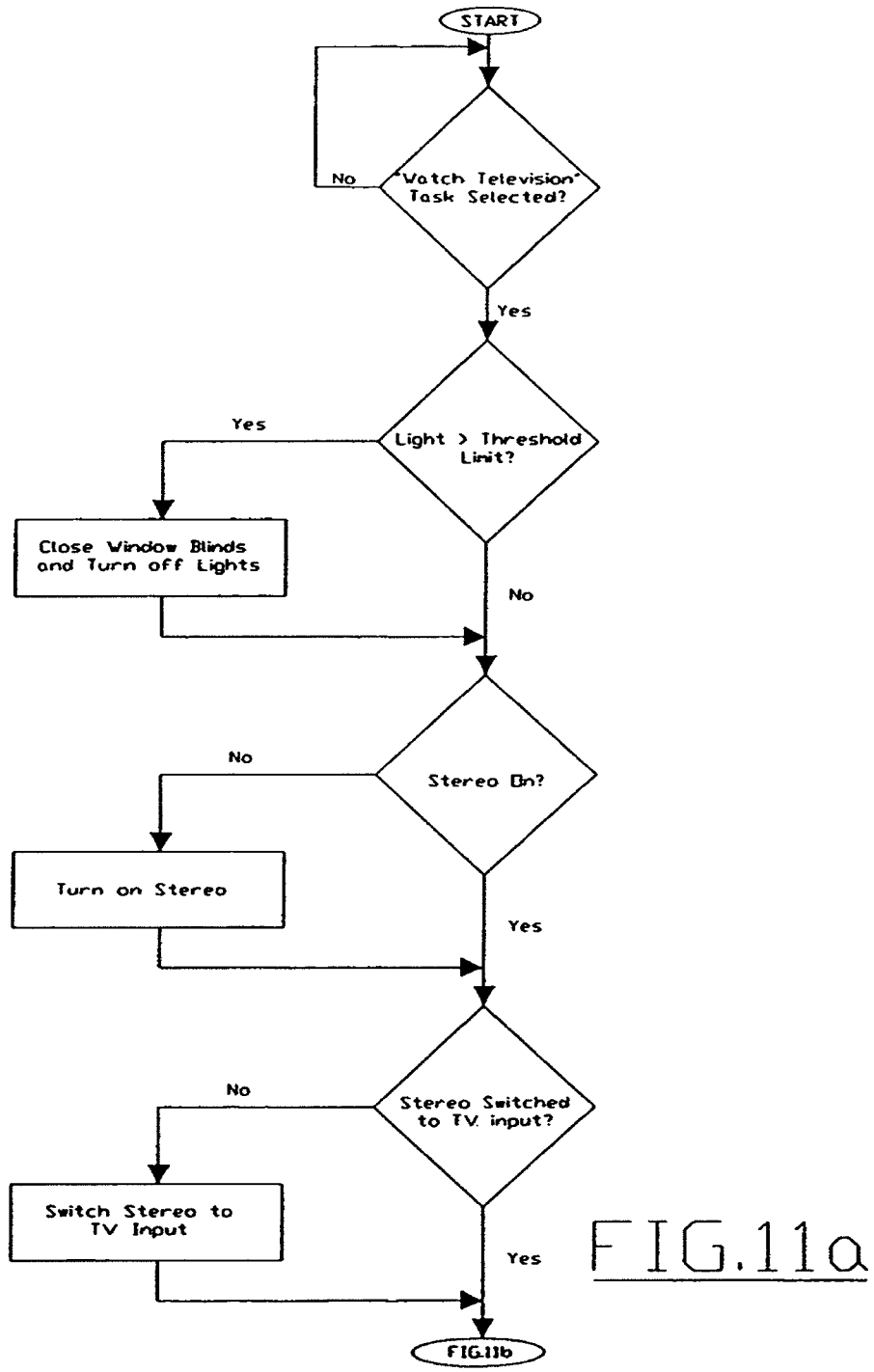
FIGS. 11a-11b is a flowchart providing an example task for watching television being executed
Figure 11B:
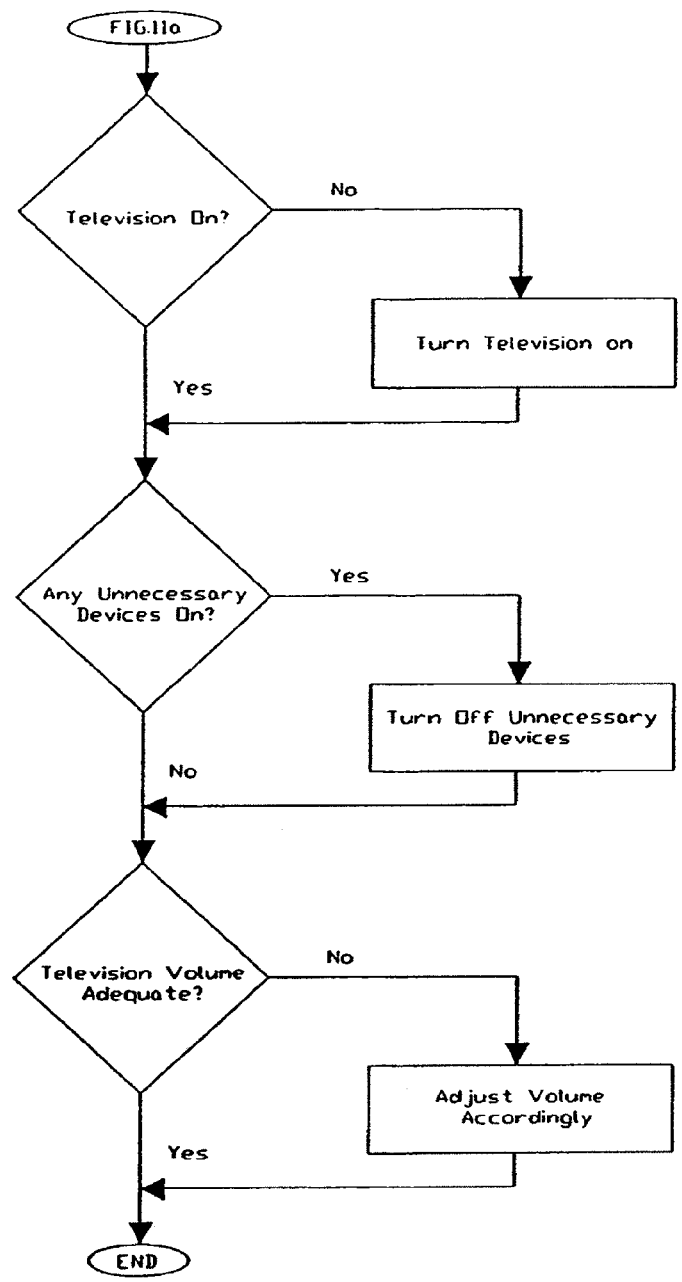

Assuming for the sake of example that a user using the present invention has (1) interior lighting, (2) electronically controlled shades, (3) a stereo, (4) a television, (5) a CD player, and (6) a VCR which are programmed and synchronized within the electronic system as stated above. FIG. 11 illustrates the "WATCH TELEVISION" task. Below is a sample listing of the "Current State Data" prior to the selection of the WATCH TELEVISION task as shown in FIG. 11 of the drawings.

| Current State Data | |
|---|---|
| External Device | Initial State Prior to Execution Task |
| 1. Room Lighting | Lights turned on and shades open during evening hours. |
| 2. Stereo | Turned on with input audio from CD player. |
| 3. Television | Turned off with volume very high. |
| 4. CD Player | On and playing CD. |
| 5. VCR | Off. |

After selecting the desired WATCH TELEVISION task, the electronic system 100 immediately reads the Current State Data and compares the same to the "Desired State Data." Below is -a listing of the Desired State Data for the WATCH TELEVISION task.

| Desired State Data | |
|---|---|
| External Device | Initial State Prior to Execution Task |
| 1. Room Lighting | Light threshold at a minimum. |
| 2. Stereo | Turned on with input audio from television. |
| 3. Television | Turned on with volume at a low-medium setting. |
| 4. CD Player | Off. |
| 5. VCR | Off. |

After comparing the Current State Data to the Desired State Data, the electronic system 100 determines that the room lighting needs to be reduced by turning off lights 15 and closing shades along with switching the audio input to the television. The electronic system 100 further determines that the television needs to be turned on and the CD player turned off. Below is a listing of the individual actions that the electronic system 100 takes to perform the WATCH TELEVISION task.

| Actions Performed to Reach Desired State | |
|---|---|
| External Device | Initial State Prior to Execution Task |
| 1. Room Lighting | Turn lighting off and close shades. |
| 2. Stereo | Switch input audio to television. |
| 3. Television | Turn on and reduce volume to low-medium setting. |
| 4. CD Player | Turn off. |
| 5. VCR | No action taken. |

After the specific actions are executed to accomplish the overall task, the memory within the electronic system 100 is automatically updated to reflect the various changes to the state of each individual external electronic device 12 for reference later. Below is a listing of the Current State Data after the WATCH TELEVISION task has been performed.

| Current State Data (After Execution of Task) | |
| --- | --- |
| External Device | Initial State Prior to Execution Task |
| 1. Room Lighting | Light threshold at a minimum. |
| 2. Stereo | Turned on with input audio from television. |
| 3. Television | Turned on with volume at a low-medium setting. |
| 4. CD Player | Off. |
| 5. VCR | Off. |

The above process is repeated for the life of the state-based remote control system 10. If additional external electronic devices are added to the overall entertainment system of the user, the user simply programs the added device 12 into the electronic system 100 and synchronizes the electronic system 100 accordingly.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

H. Configuration

The user wishes to configure the remote control to operate the user's home entertainment system. Based on the devices previously identified by the user, the Programming System provides a default configuration for the remote control that will allow the user to operate all components of the home entertainment system. Because the home entertainment system includes a television, the Programming System prompts the user to select which cable provider is being used. Because the home entertainment system includes a CD jukebox, then user is asked if he wishes to enter CD title information. With each CD selected by the user, the Programming System uses the Internet to connect to a CD database server and obtain artist, title, and track information. The Programming System then provides the user with a list of common macros which the user may be interested in adding to his configuration. The Programming System then uses the Internet to connect to TVGuide.com and download the current television schedule. The Programming System then transfers all necessary code and data to the remote control. Finally, the Programming System asks the user if he wishes to print out a booklet that describes the operation of the configured remote control.

Example: The user wishes to add the television channel "Global" to his list of preferred content. The user uses the Programming System to add the channel, and then the Programming System transfers the changed configuration to the remote control. Now, when the user browses available television channels on the remote control, the television channel "Global" is at the top of the list.

Example: The user wishes to customize the operation of the remote control. The user uses the Programming System to change the default television show reminder to be 'Sound an alarm 1 minute before the show starts', and changes the navigation up key to select the function 'View cable television channel 50'.

It is noted that the Programming System may store the configuration information to allow the user to incrementally modify the configuration. For example, the user may add a new CD title to the CD jukebox. It is noted that the Programming System may be used to modify any aspect of the configuration (data and/or code) of the remote control. For example, this can even include complete functionality changes where one user develops software designed to control a home automation system, and then allows other users to use the Programming System to configure their remote control s with the new software and associated data.

It is noted that the Programming System may use any available information to assist the user in customizing the operation of the remote control, including but not limited to:
Device Network Information
User Preferences
Sample configurations provided by other users.

Figure 12:
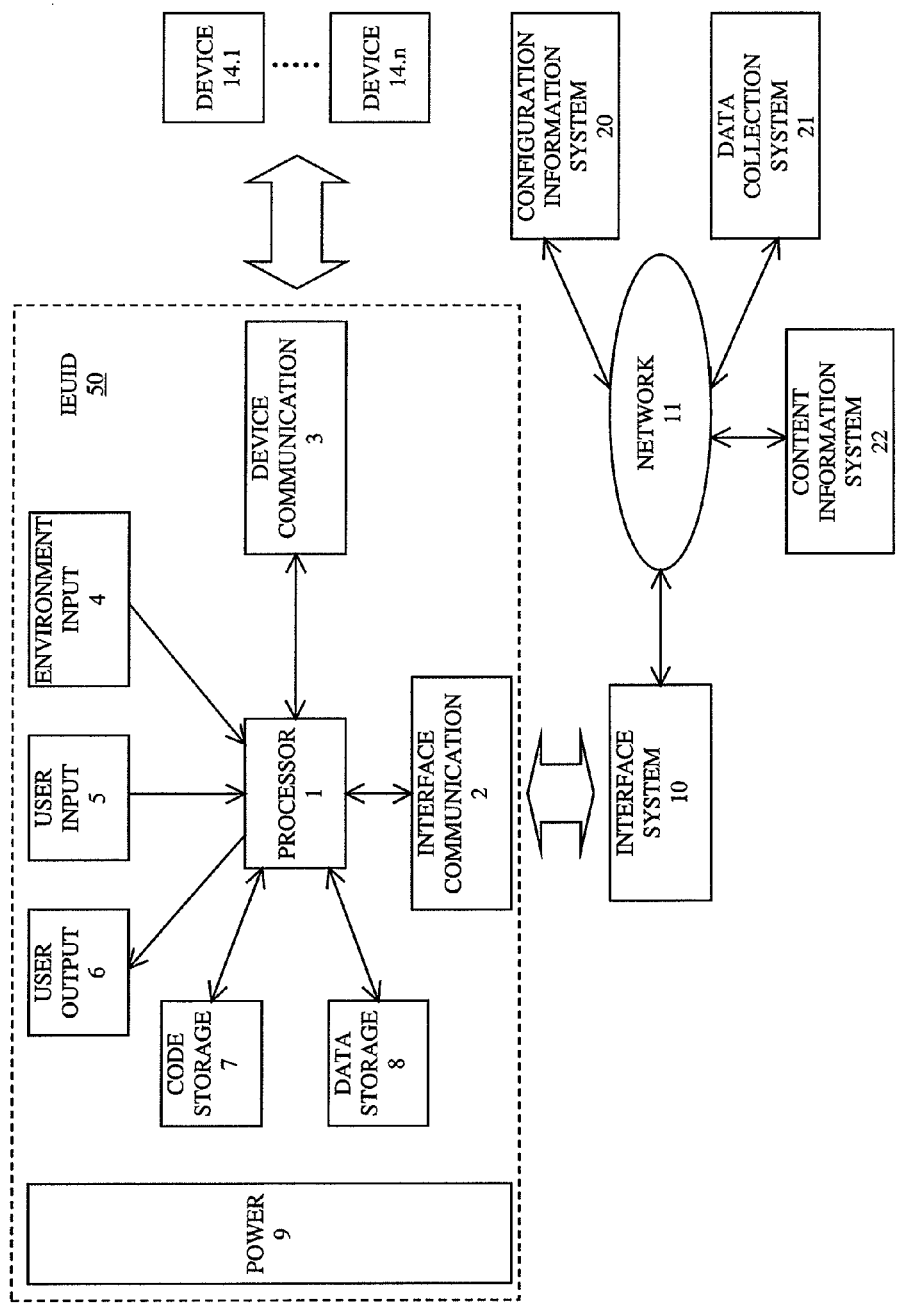
FIG. 12 is a simplified schematic of a remote control system according to one embodiment of the present invention.
Figure 13:
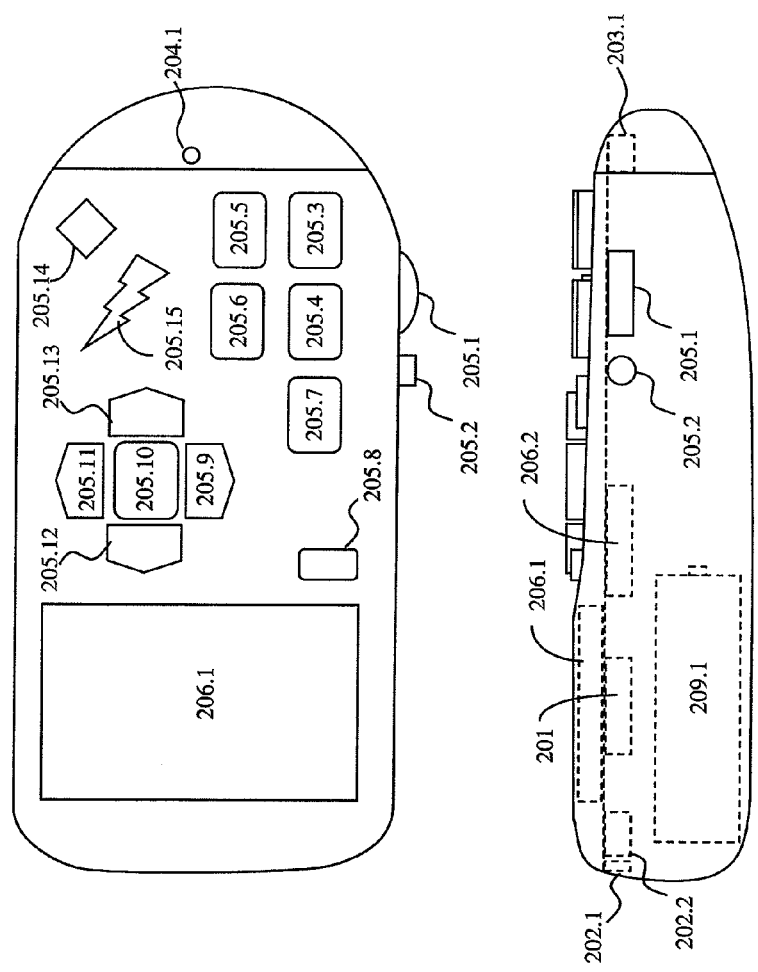
FIG. 13 is a simplified schematic of a remote control system according to another embodiment of the present invention.

It is noted that the Programming System is designed to make the remote control simple to configure for a novice user. For example, if the user has specified to the Programmer 10 (see FIGS. 12 and 13) that they wish to control a television and videocassette recorder, then the Programmer 10 may allow the user to select from common operations that are performed with systems containing a television and videocassette recorder. Examples of such operations include 'Play a videotape' and 'Record a television show'. If the user chooses to accept such an operation, then the Programming System configures the remote control in such a manner as to ensure that when the user selects the operation 'Play a videotape' then the remote control sends control signals as required to direct the Device Network to perform the desired operation (if possible).

It is noted that the remote control may be purchased preconfigured to the user's preferences, in which case configuration via the Programming System is optional.

It is noted that the remote control may be configured using the user input module 5, user output module 6 and device communication module 3, in which case the remote control is the sole component of the Programming System, and the connection to the Interface System 10 is optional. For example, the remote control can be instructed to 'learn' a remote control code from an infrared remote control, as is well known in the art.

It is noted that the remote control may be configured using just the Interface System 10, in which case the Interface System 10 is sole component of the Programming System.

It is noted that the Programming System may display arbitrary information to the user. For example, while the remote control is communicating with the Programming System the user may be shown advertising based on the types of television shows that the user enjoys watching.

It is noted that the user may use the remote control to alter any aspect of the configuration of the remote control. For example, the user may instruct the remote control to remember a sequence of commands and assign them to a new menu option.

It is noted that the user may interact with the Programming System when the remote control is not connected to the Programming System, in which case any changes will be transferred to the remote control at a later date.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A remote control system comprising:
   a remote control device configured to control a plurality of consumer electronic devices; and
   a programming system configured to:
   i) receive identifying information, which identifies each of the consumer electronic devices,
   ii) generate, based at least in part upon the identifying information, at least one dynamic command code set, which is configured for collectively controlling the consumer electronic devices to perform a media function; and
   iii) issue a query to a user to determine whether the generated dynamic command code set is to be used by the remote control device, and, as a result of a positive response to the query being received by the programming system, configure the remote control device for using the dynamic command code set,
   wherein, the dynamic command code set is configured to be modified by the remote control device based at least in part on state data stored by the remote control device for the consumer electronic devices.

2. The remote control system of claim 1, wherein the programming system forms a portion of the remote control device.

3. The remote control system of claim 1, wherein the programming system is configured to communicate with the remote control device.

4. The remote control system of claim 3, wherein the programming system is configured to transfer command codes to the remote control device for the dynamic command code set.

5. The remote control system of claim 1, wherein the remote control device is configured to send command codes from the dynamic command code set to at least one of the plurality of consumer electronic devices to collectively control the at least one of the plurality of consumer electronic devices.

6. The remote control system of claim 1, wherein the remote control device includes an input module configured to receive input from a user for receiving the identifying information.

7. The remote control system of claim 1, wherein the remote control device includes an output module configured to issue the query.

8. The remote control system of claim 1, wherein the dynamic command code set is a macro.

9. A remote control comprising:
   an electronic module configured to control a plurality of consumer electronic devices;
   input module configured to receive a user input for identifying information, which identifies each of the consumer electronic devices; and
   a programming system configured to:
   i) generate, based at least in part upon the identifying information, at least one macro, which is configured for collectively controlling the consumer electronic devices to perform a media function; and
   ii) issue a query to a user to determine whether the generated macro is to be used by the remote control device, and, as a result of a positive response to the query being received by the programming system, configure the remote control device for using the macro,
   wherein, the macro is configured to be modified by the remote control based at least in part on state data stored by the remote control for the consumer electronic devices.

10. The remote control of claim 9, wherein the electronic module is configured to send command codes from the macro to at least one of the plurality of consumer electronic devices to collectively control the at least one of the plurality of consumer electronic devices.

11. The remote control of claim 10, further comprising an output module configured to issue the query.

12. The remote control of claim 10, wherein the macro is dynamically generated by the programming system.

13. The remote control system of claim 1, wherein the remote control device has a touch screen.

14. The remote control system of claim 13, wherein the programming system forms a portion of the remote control device.

15. The remote control of claim 9, wherein the input module is a touch screen.

16. The remote control of claim 15, wherein the touch screen also comprises the output module.

17. The remote control of claim 9, wherein the electronic module is physically separate from the input module and the programming system.

18. The remote control of claim 17, further comprising a touch screen, wherein the touch screen incorporates the input module and an output module configured to issue the query.

19. A method for remotely controlling a plurality of consumer electronic devices, comprising:
   obtaining identifying information about the plurality of consumer electronic devices;
   generating, based at least in part upon the obtained identifying information, at least one dynamic command code set that is configured to control the plurality of consumer electronic devices to perform a media function;
   querying a user whether to use the generated dynamic command code set to control the plurality of consumer electronic devices;
   as a result of receiving a positive response to the querying from the user, then using the at least one dynamic command code set to control the plurality of consumer electronic devices; and
   then modifying the at least one dynamic command code set based at least in part on state data for the plurality of consumer electronic devices.

20. The method of claim 19, wherein the dynamic command code set is a macro.

21. The method of claim 20, wherein the macro is used by sending the macro to at least one of the consumer electronic devices to collectively control the at least one of the consumer electronic devices.

22. The method of claim 20, wherein the macro is dynamically generated.

23. One or more non-transitory computer-readable storage media having collectively stored thereon executable instructions that, when executed by one or more processors of a computer system, cause the computer system to at least:
   obtain identifying information about a plurality of consumer electronic devices;

generate, based at least in part upon the obtained identifying information, at least one dynamic command code set that is configured to control the plurality of consumer electronic devices to perform a media function; and query a user whether to use the generated dynamic command code set to control the plurality of consumer electronic devices;

as a result of receiving a positive response to the querying from the user, then use the at least one dynamic command code set to control the plurality of consumer electronic devices, and then modifying the at least one dynamic command code set based at least in part on state data for the plurality of consumer electronic devices.

24. The computer-readable storage media of claim 23, wherein the instructions cause the computer system to further send command codes from the dynamic command code set to at least one of the consumer electronic devices to collectively control the at least one of the consumer electronic devices.

25. The computer-readable storage media of claim 23, wherein the instructions cause the computer system to further obtain the identifying information by processing input from a user of the computer system.

\* \* \* \* \*